(12) United States Patent　　(10) Patent No.: US 9,164,693 B2
Hara et al.　　(45) Date of Patent: ＊Oct. 20, 2015

(54) REMOTE COPY SYSTEM AND REMOTE COPY CONTROL METHOD

(71) Applicant: Hitachi, Ltd., Tokyo (JP)

(72) Inventors: Junichi Hara, Sagamihara (JP); Junji Ogawa, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,106

(22) Filed: May 13, 2014

(65) Prior Publication Data

US 2014/0250271 A1　Sep. 4, 2014

Related U.S. Application Data

(63) Continuation of application No. 13/379,186, filed as application No. PCT/JP2011/006861 on Dec. 8, 2011, now Pat. No. 8,762,638.

(51) Int. Cl.
*G06F 12/06* (2006.01)
*G06F 3/06* (2006.01)
*G06F 11/10* (2006.01)

(52) U.S. Cl.
CPC ............... *G06F 3/065* (2013.01); *G06F 3/064* (2013.01); *G06F 3/0626* (2013.01); *G06F 3/0632* (2013.01); *G06F 3/0658* (2013.01); *G06F 3/0685* (2013.01); *G06F 3/0689* (2013.01); *G06F 11/1076* (2013.01); *G06F 2212/401* (2013.01)

(58) Field of Classification Search
None
See application file for complete search history.

(56) References Cited

U.S. PATENT DOCUMENTS 6,449,689 B1　9/2002　Corcoran et al.
2006/0200506 A1　9/2006　Desimone et al.

FOREIGN PATENT DOCUMENTS

JP　2010-086120 A　4/2010

*Primary Examiner* — Duc Doan
(74) *Attorney, Agent, or Firm* — Volpe and Koenig, P.C.

(57) ABSTRACT

A first storage system comprises a first RAID group comprising multiple first storage devices, which constitute the basis of a first logical volume. A second storage system comprises a second RAID group comprising multiple second storage devices, which constitute the basis of a second logical volume. The RAID configuration of the first RAID group and the RAID configuration of the second RAID group are the same, and the type of a compression/decompression function of the respective first storage devices and the type of a compression/decompression function of the respective second storage devices are the same. Compressed data is read from a first storage device without being decompressed with respect to the data inside a first logical volume, and the read compressed data is written to a second storage device, which is in the same location in RAID in the second RAID group as the location in RAID of this first storage device.

8 Claims, 33 Drawing Sheets

| RAID group configuration information ID | Location in RAID | Storage device ID |
|---|---|---|
|  |  |  |
| RGCONF_01 | 0 | FPK_00 |
|  | 1 | FPK_01 |
|  | 2 | FPK_02 |
| RGCONF_02 | 0 | FPK_03 |
|  | 1 | FPK_04 |
| RGCONF_03 | 0 | SAS_00 |
|  | 1 | SAS_01 |
|  | 2 | SAS_02 |
| ⋮ | ⋮ | ⋮ |

Fig. 12

| Storage device ID | Storage device type | Capacity | Compression/ decompression unit status | Compression/ decompression algorithm |
|---|---|---|---|---|
| FPK_00 | FPK | 10GB | ON | Algorithm-A |
| FPK_01 | FPK | 10GB | ON | Algorithm-A |
| FPK_02 | FPK | 10GB | ON | Algorithm-A |
| FPK_03 | FPK | 20GB | ON | Algorithm-B |
| FPK_04 | FPK | 20GB | ON | Algorithm-B |
| SAS_00 | SAS | 20GB | N/A | - |
| SAS_01 | SAS | 20GB | N/A | - |
| SAS_02 | SAS | 20GB | N/A | - |
| SSD_00 | SSD | 5GB | N/A | - |
| : | : | : | : | : |

Fig. 13

| Storage system ID | VOL ID | Capa-city | Used capa-city | Actual used capacity | RAID group ID | Start address (RAID group) | Data length (RAID group) |
|---|---|---|---|---|---|---|---|
| STG_00 | VOL_00 | 20GB | 10GB | 3GB | RG_00 | 0x00000000 | 10GB |
| | VOL_01 | 15GB | 5GB | 2GB | RG_01 | 0x00020000 | 5GB |
| | VOL_02 | 24GB | 4GB | 4GB | RG_02 | 0x00030000 | 4GB |
| : | : | : | : | : | : | : | : |

347

| Storage destination VOL ID | Capacity | Used capacity | Actual used capacity | RAID level | Compression /decompression algorithm | Data storage destination ID |
|---|---|---|---|---|---|---|
| 351 | 352 | 357 | 353 | 354 | 355 | 356 |
| ARC_00 | 20GB | 10GB | 3GB | RAID5 | Algorithm_A | ARCCONF_00 |
| : | : | : | : | : | : | : |

| Data storage destination ID | RAID level | Location in RAID | Storage destination VOL ID | Start address (RAID group) | Data length (RAID group) |
|---|---|---|---|---|---|
| 361 | 362 | 363 | 364 | 365 | 366 |
| ARCCONF_00 | RAID5 | 0 | VOL_09 | 0x00000000 | 3GB |
|  |  | 1 | VOL_09 | 0x00001000 | 3GB |
|  |  | 2 | VOL_10 | 0x00000000 | 3GB |
| : | : | : | : | : | : |

Fig. 36

REMOTE COPY SYSTEM AND REMOTE COPY CONTROL METHOD

TECHNICAL FIELD

The present invention relates to technology for remote copying performed between storage systems.

BACKGROUND ART

In a remote copy operation, a line (for example, a line of a WAN (Wide Area Network) managed by a telecommunications vendor may be leased, and remote copying may be performed between storage systems by way of this leased line. For this reason, when the amount of data being sent and received between the storage systems increases, communications charges rise proportionally. These communications charges account for a large percentage of the costs involved in operating a remote copy system. Therefore, the smaller the amount of data sent and received between storage systems the better.

One method for reducing communications charges is to compress the data sent from the one storage system to the other storage system. However, the problem is that for a storage system, which does not comprise a data compression function, an appliance (a dedicated device) for compressing and sending data must be purchased and installed separately from the storage system, which is both costly and time consuming.

Another problem is that even though an appliance is purchased and installed, it is not possible to compress the data to be sent beyond expectations (that is, the data amount cannot be reduced very much). This is because the extent to which the data amount can be compressed depends on the type of data being sent, and until the appliance is actually operated, there is no way of identifying the type of data being handled. For example, in a case where the data to be sent is JPEG (Joint Photographic Experts Group) data, the JPEG data cannot be compressed much because it is already compressed.

Alternatively, there are storage systems, which use a storage device comprising a data compression function (for example, a SSD (Solid State Drive)). The SSD compresses write-target data, partitions the compressed data on the basis of the size of a page, which is the read/write unit, and writes the partitioned data to a page together with a guarantee code (for example, an ECC (Error Correcting Code)) for each write-destination page (Patent Literature 1).

CITATION LIST

Patent Literature

[PTL 1]
Japanese Patent Application Laid-open No. 2010-86120

SUMMARY OF INVENTION

Technical Problem

However, in a case where compressed data has been read from an FM chip, the SSD restores (decompresses) and outputs this data. For this reason, even though an SSD is used as the storage device in the storage system, the amount of data being sent and received between the storage systems is unable to be reduced.

This problem is not limited to the SDD, but can also occur in a case where another type of storage device comprising a data compression function (for example, a HDD (Hard Disk Drive)) is used.

Therefore, an object of the present invention is to enable the amount of data being sent and received between storage systems to be reduced even though a storage device comprising a data compression function is being used as the storage device in the storage system.

Solution to Problem

In a remote copy system comprising a first storage system, and a second storage system, which is coupled to the first storage system by way of a communications network, the first storage system comprises a first RAID group comprising multiple first storage devices, which constitute the basis of a first logical volume, and a first controller, which is coupled to the first RAID group. The second storage system comprises a second RAID group comprising multiple second storage devices, which constitute the basis of a second logical volume, and a second controller, which is coupled to the first controller and the second RAID group.

The RAID configuration of the first RAID group and the RAID configuration of the second RAID group are the same, each first storage device configuring the first RAID group comprises a first compression/decompression function for compressing write-target data and for decompressing read-target compressed data, and each second storage device configuring the second RAID group comprises a second compression/decompression function for compressing write-target data and for decompressing read-target compressed data. The type of the second compression/decompression function is the same as the type of first compression/decompression function.

In a case where a first remote copy, which is a remote copy of data from the first logical volume to the second logical volume, is performed:
(A) compressed data is read from each first storage device in accordance with the first controller sending a read request to each first storage device configuring the first RAID group for reading the compressed data without performing decompression with respect to data inside the first logical volume; and
(B) the read compressed data is transferred to the second controller by way of the communication network for each first storage device, and the compressed data is written to an area corresponding to the second logical volume of a second storage device in accordance with the second controller sending a write request for writing the compressed data without performing a compression to this second storage device, which is in the same location in RAID in the second RAID group as the location in RAID of the first storage device.

The location in RAID is the location of the storage device in the RAID group.

BRIEF DESCRIPTION OF DRAWINGS

FIG. 12 shows an example of a RAID group configuration information table 95.

FIG. 13 shows an example of a storage device information table 96.

FIG. 35 shows an example of the configuration of a storage VOL information table 347.

FIG. 36 shows an example of a data storage destination information table 348.

DESCRIPTION OF THE EMBODIMENTS

A number of examples will be explained. Furthermore, the technical scope of the present invention is not limited to the respective examples.

Furthermore, in the following explanation, various types of information may be explained using the expression "xxx table", but the various information may also be expressed using a data structure other than a table. To show that the various information is not dependent on the data structure, "xxx table" can be called "xxx information".

Also, in the following explanation, there may be cases where processing is explained having a "program" as the doer of the action, but since the stipulated processing is performed in accordance with a program being executed by a processor (for example, a CPU (Central Processing Unit)) while using a storage resource (for example, a memory) and a communication control device (for example, a communication port) as needed, the processor may also be used as the doer of the processing. A process, which is explained using the program as the doer of the action, may be regarded as a process performed by a management system. Also, either all or part of a program may be realized in accordance with dedicated hardware. For this reason, a process, which is explained using the program as the doer of the action, may be regarded as a process performed by a controller. The controller may comprise a processor and a storage resource for storing a computer program executed in the processor, or may comprise the above-mentioned dedicated hardware. A computer program may be installed in respective computers from a program source. The program source, for example, may be either a program delivery server or a storage medium.

Furthermore, in the following explanation, a management system is one or more computers, for example, either a management computer or a combination of a management computer and a display computer. Specifically, for example, in a case where the management computer displays information for display, the management computer is the management system. Also, the same functions as those of the management computer may be realized using multiple computers to increase the speed and reliability of processing, and in this case, the relevant multiple computers (may comprise a display computer in a case where the display computer performs the display) are the management system.

Example 1

Figure 1:
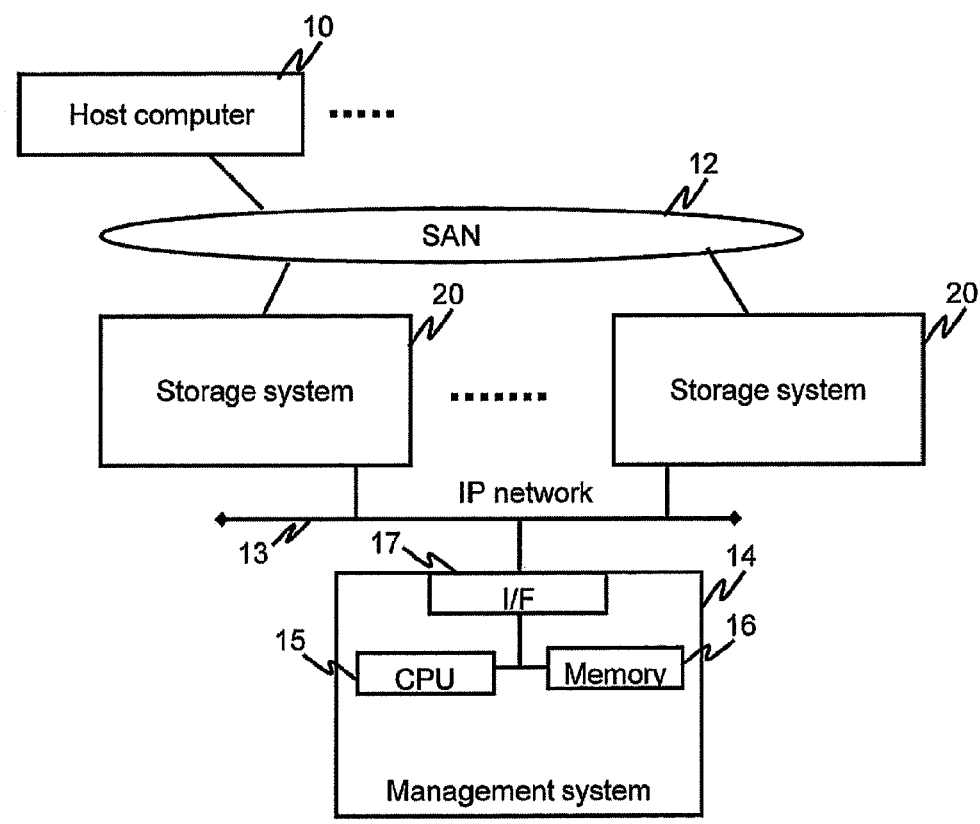
FIG. 1 shows an example of the configuration of a computer system comprising a remote copy system related to Example 1.

FIG. 1 shows an example of the configuration of a computer system related to Example 1.

The computer system comprises a host computer 10 and a remote copy system. The remote copy system comprises a management system 14 and multiple storage systems 20. The host computer 10 and the respective storage systems 20 are coupled by way of a first communication network, for example a SAN (Storage Area Network) 12. The respective storage systems 20 and the management system 14 are coupled by way of a second communication network, for example, an IP network (a communication network in which communications are performed in accordance with IP (Internet Protocol)) 13.

The management system 14 comprises a communication interface device 17, a storage device, and a control device coupled thereto. The communication interface device 17 is denoted as "I/F". The storage device, for example, is a memory 16. The control device, for example, is a CPU (Central Processing Unit) 15. The management system 14 is coupled to the second communication network 13 via the I/F 17. The memory 16 stores a program for managing the storage system 20 and various types of information. The CPU 15 realizes various functions in accordance executing the program stored in the memory 16. Furthermore, in addition to a processor like the CPU 15, the control device may comprise a dedicated hardware circuit for performing a prescribed process (for example, compression, decompression, coding or decoding).

Figure 2:
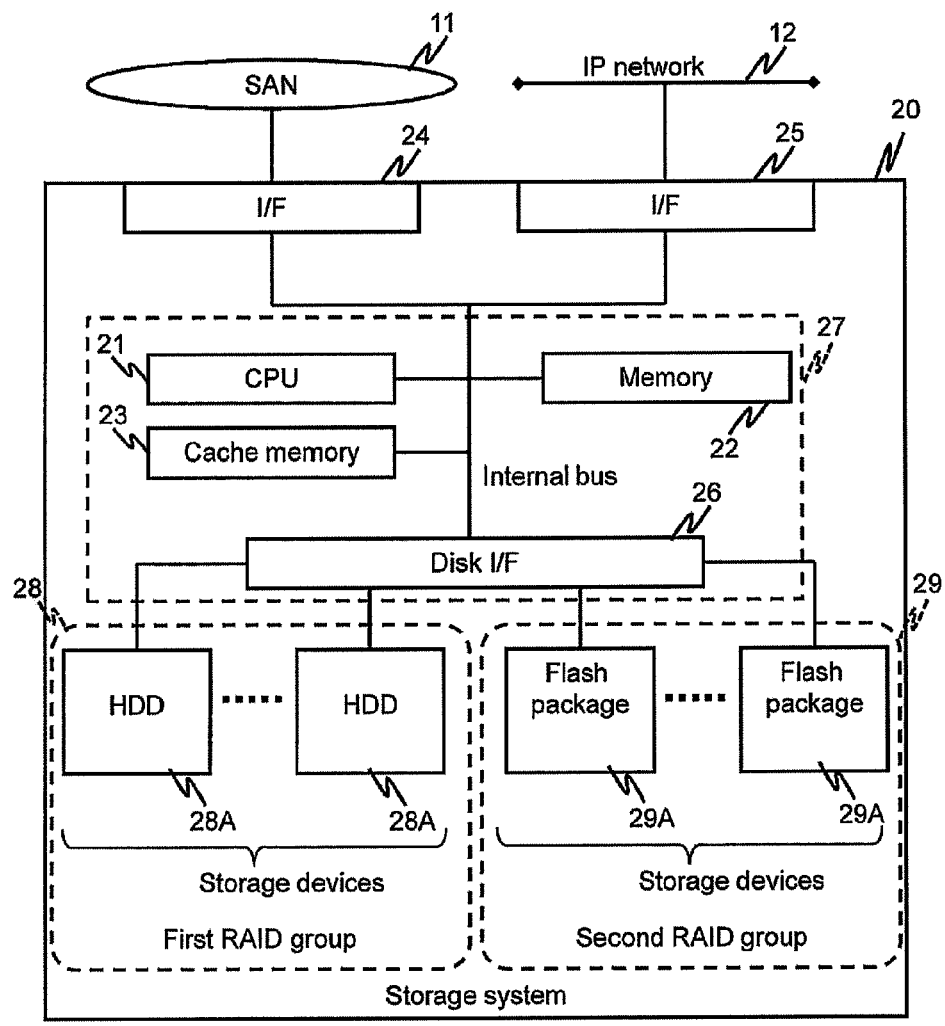
FIG. 2 shows an example of the configuration of a storage system 20.

FIG. 2 shows an example of the configuration of the storage system 20.

The storage system 20 comprises a controller 27, and a storage device group, which is coupled to the controller 27. The storage device group may comprise different types of storage media, or may be configured from the same type of storage media.

The controller 27 comprises communication interface devices, storage devices, and a control device, which is coupled thereto. The communication interface devices, for example, include I/Fs 24 and 25, and a disk I/F 26. The storage devices, for example, include a memory 22 and a cache memory 23. The control device, for example, is a CPU 21. In addition to the CPU 21, the control device may also comprise a dedicated hardware circuit for performing a prescribed process (for example, compression, decompression, coding or decoding).

The I/F 24 is coupled to the SAN 11. The I/F 25 is coupled to the IP network 12. The disk I/F 26 is coupled to the storage device group.

The memory 22 stores various programs and information for the controller 27 to manage the storage system 20. The CPU 21 realizes various functions in accordance with executing a program based on the information stored in the memory 22.

The cache memory 23 is normally a volatile memory such as a DRAM (Dynamic Random Access Memory). The cache memory 23 temporarily stores data, which is to be written to any of the storage device groups, and data, which has been read from a storage device group. For example, the controller 27 receives a write request from the host computer 10, writes data conforming to this write request to the cache memory 23, and completes this write request (for example, sends a completion report with respect to the write request to the host computer 10).

The storage device group comprises multiple RAID (Redundant Array of Independent (or Inexpensive) Disks) groups. Data is stored in a RAID group in accordance with a prescribed RAID level. A logical volume (hereinafter, simply called VOL) is created based on the storage space of the RAID group. There is a VOL of the type, which is provided to the host computer 10, and there is a VOL of the type, which is not. The former VOL is specified in accordance with an I/O request from the host computer 10. The latter VOL, for example, is a component of a pool, which comprises a storage area for allocating to a virtual VOL (a VOL conforming to Thin Provisioning), which is provided to the host computer 10.

As the RAID groups, for example, there is one or more first RAID groups 28, and one or more second RAID groups 29. The first RAID group 28 is configured using multiple first type storage devices, for example, HDDs (Hard Disk Drives) 28A. The second RAID group 29 is configured using multiple flash packages 29A. A RAID group of a prescribed level may be configured using these multiple flash packages 29A the same as the first RAID group 28. As will be explained further below, the flash package 29A comprises multiple FM (Flash Memory) chips 37.

Furthermore, in this example, the HDD 28A does not comprise functions for compressing and decompressing data, and the flash package 29A does comprise functions for compressing and decompressing data. However, the HDD 28A may comprise functions for compressing and decompressing data.

Figure 3:
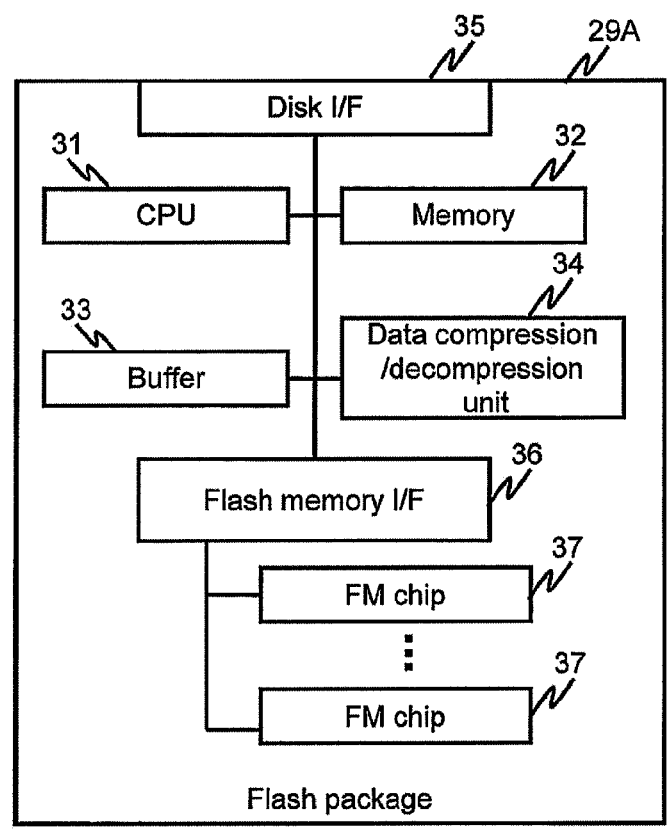
FIG. 3 shows an example of the configuration of a flash package 29A.

FIG. 3 shows an example of the configuration of the flash package 29A.

The flash package 29A comprises multiple FM chips 37, and an FM controller coupled thereto.

The FM chip 37, for example, is configured in accordance with multiple physical blocks. Each physical block is configured using multiple physical pages. The FM chip 37, for example, is a NAND-type flash memory. Each cell of the FM chip 37 may be a SLC (Single Level Cell) or a MLC (Multi Level Cell).

The FM controller comprises communication interface devices, storage devices, and a control device coupled thereto. As the communication interface devices, for example, there is a disk I/F 35 and a flash memory I/F 36. As the storage devices, for example, there is a memory 32 and a buffer 33. The control device, for example, comprises a CPU 31 and a data compression/decompression unit 34.

The memory 32 stores various types of programs and information for managing the flash package 29A. The CPU 31 realizes various functions in accordance with executing a program based on the information stored in the memory 32.

The buffer 33 is an area for temporarily storing data to be written to the FM chip 37 from the controller 27, and data to be read to the controller 27 from the FM chip 37. The buffer 33 may be a portion (s) of one or more FM chips 37.

The data compression/decompression unit 34, for example, is a hardware circuit, and comprises a function for compressing data stored in the buffer 33 from the controller 27, and decompressing compressed data (data, which has been compressed) stored in the buffer 33 from the FM chip 37.

The disk I/F 35 is coupled to the disk I/F 26 of the controller 27.

The flash memory I/F 36 is coupled to multiple FM chips 37 via multiple buses. The flash memory I/F 36 uses a CE (Chip Enable) signal to independently control multiple FM chips 37 coupled to the same bus.

The flash memory I/F 36 operates in accordance with a read/write request from the CPU 31. A physical address (PBA (Physical Block Address)) of a read source or a write destination area is specified in this read/write request. The flash memory I/F 36 computes a read-source or a write-destination physical block and physical page from this PBA, and performs a read/write process with respect to the computed physical block and physical page.

An ECC (Error Correction Code) creation circuit and an ECC correction circuit are provided in the flash memory I/F 36. At the time of a write, the ECC creation circuit creates an ECC with respect to compressed data in the buffer 33, and the compressed data is written to the FM chip 37 together with the ECC. Also, at the time of a read, the ECC correction circuit checks the compressed data (read data) from the FM chip 37 in the buffer 33, and in a case where a data loss has been detected, the compressed data is corrected in accordance with the ECC correction circuit in the buffer 33.

Figure 4:
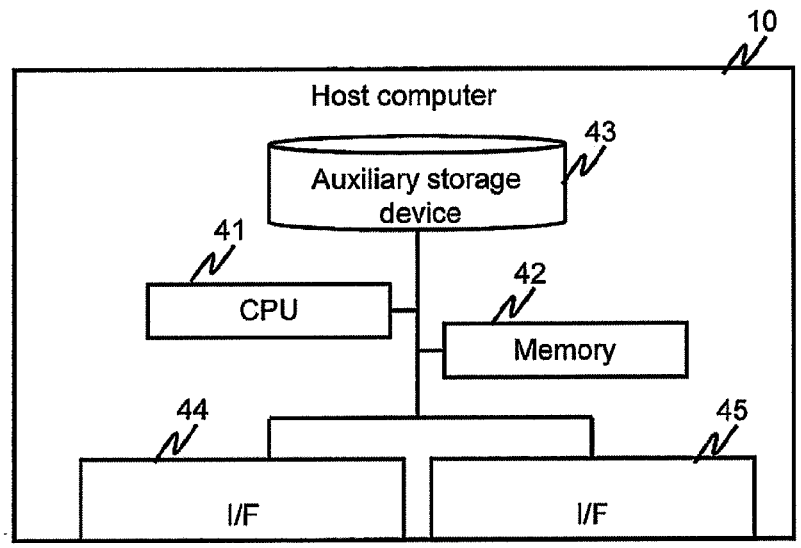
FIG. 4 shows an example of the configuration of a host computer 10.

FIG. 4 shows an example of the configuration of the host computer 10.

The host computer 10 comprises communication interface devices, storage devices, and a control device coupled thereto. As the communication interface devices, there are I/F 44 and 45. The storage devices include a memory 42 and an auxiliary storage device 43. The control device comprises a CPU (Central Processing Unit).

The memory 42 stores various types of programs and information for managing the host computer 10. The CPU 41 realizes various functions in accordance with executing the programs based on the information stored in the memory 42.

The auxiliary storage device 43 is a physical nonvolatile storage device (for example, a HDD). The auxiliary storage device 43, for example, stores data to be written to the storage system 20, and data, which has been read from the storage system 20.

Figure 5:
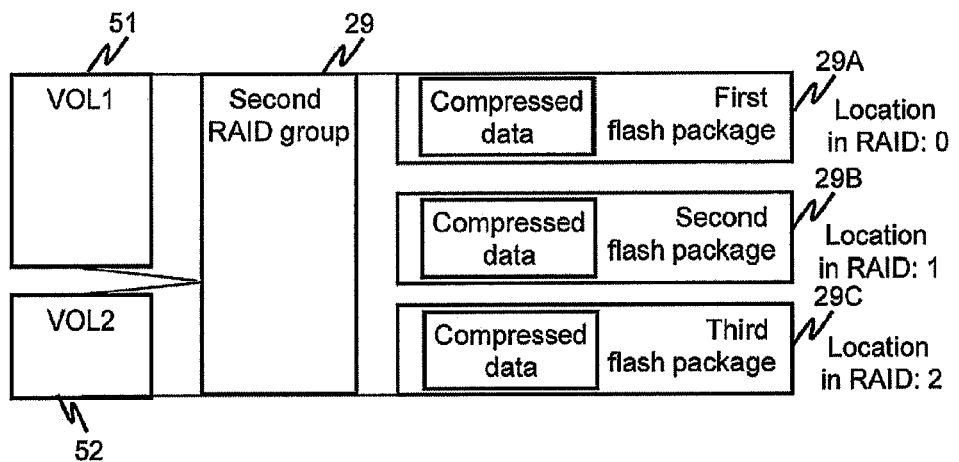
FIG. 5 shows an example of the relationship between a physical storage device and a logical storage device.

FIG. 5 shows an example of the relationship between a physical storage device and a logical storage device.

In the drawing, a flash package, which is a component of the second RAID group 29, is used as an example of the physical storage device. For example, a certain second RAID group 29 comprises three flash packages 29A, 29B, and 29C. Two VOLs 51 and 52 are created from the storage space of the second RAID group 29. The created two VOLs 51 and 52, for example, may respectively be provided to the host computer 10, or may be used as components of the above-mentioned pool.

According to the example in the drawing, the controller 27 creates three data units based on the data to be written to either VOL 51 or 52, and respectively sends these three data units to three flash packages 29A, 29B and 29C configuring the second RAID group 29. The data unit is a portion of the data to be written to either VOL 51 or 52 (or a parity created on the basis of this data). The flash package 29A receives the data unit, the data compression/decompression unit 34 compresses this data unit, and the data, which has been compressed (compressed data), is written to an area corresponding to the write-destination area in either VOL 51 or 52 in multiple FM chips 37.

Figure 6:
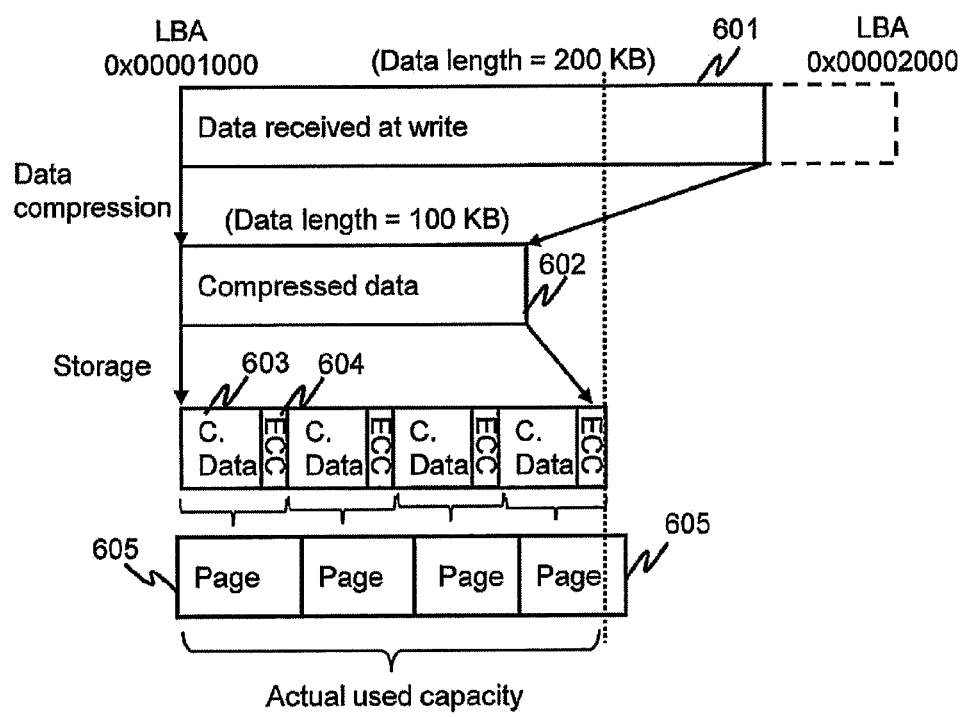
FIG. 6 shows an overview of a data write process in a flash package 29.

FIG. 6 shows an overview of a data write process in a flash package 29.

The CPU 31 receives a write command from the controller 27 specifying a write-target data unit (data received at write in the drawing) and a write-destination logical address (LBA (Logical Block Address)).

The CPU 31 identifies the PBA (Physical Block Address) of the FM chip 37 corresponding to the LBA specified in this write command, and writes the data to a storage area corresponding to the identified PBA.

Specifically, for example, the CPU 31 (disk I/F 35) temporarily writes the received data unit 601 to the buffer 33, and creates compressed data 602 by compressing data in accordance with the data compression/decompression unit 34. Then, the CPU 31 (disk I/F 35) partitions the compressed data 602 (hereinafter, referred to as partitioned compressed data) in the buffer 33 in accordance with the size of a page 605, and creates a guarantee code (ECC in the drawing) 604 for each piece of partitioned compressed data 603. Thereafter, the CPU 31 writes the partitioned compressed data 603 to the physical page 605 together with the guarantee code 604.

As will be explained further below, in a case where the controller 27 reads the compressed data 602 from the FM chip 37 (physical page 605) as-is without decompressing this data 602, first of all, the controller 27 sends a read command specifying the LBA (Logical Block Address) of the data 601 to be read to the flash package 29A. Then, the CPU 31 (disk I/F 35) of the flash package 29A receives the read command, reads the partitioned compressed data 603 together with the ECC 604 from the physical page 605 conforming to the PBA corresponding to the LBA specified in this read command, and writes the read partitioned compressed data 603 and ECC 604 to the buffer 33. Then, the CPU 31 causes the ECC correction circuit in the flash memory I/F 36 to check each read piece of partitioned compressed data 603 based on the ECC 604 corresponding to each piece of partitioned compressed data 603, and in a case where an error has not occurred in the respective pieces of partitioned compressed data 603, which were read, creates compressed data 602 from which the ECC 603 is excluded. The data length of the created compressed data 602 typically is shorter than the data length of the data unit obtained in accordance with decompressing the compressed data.

Figure 7:
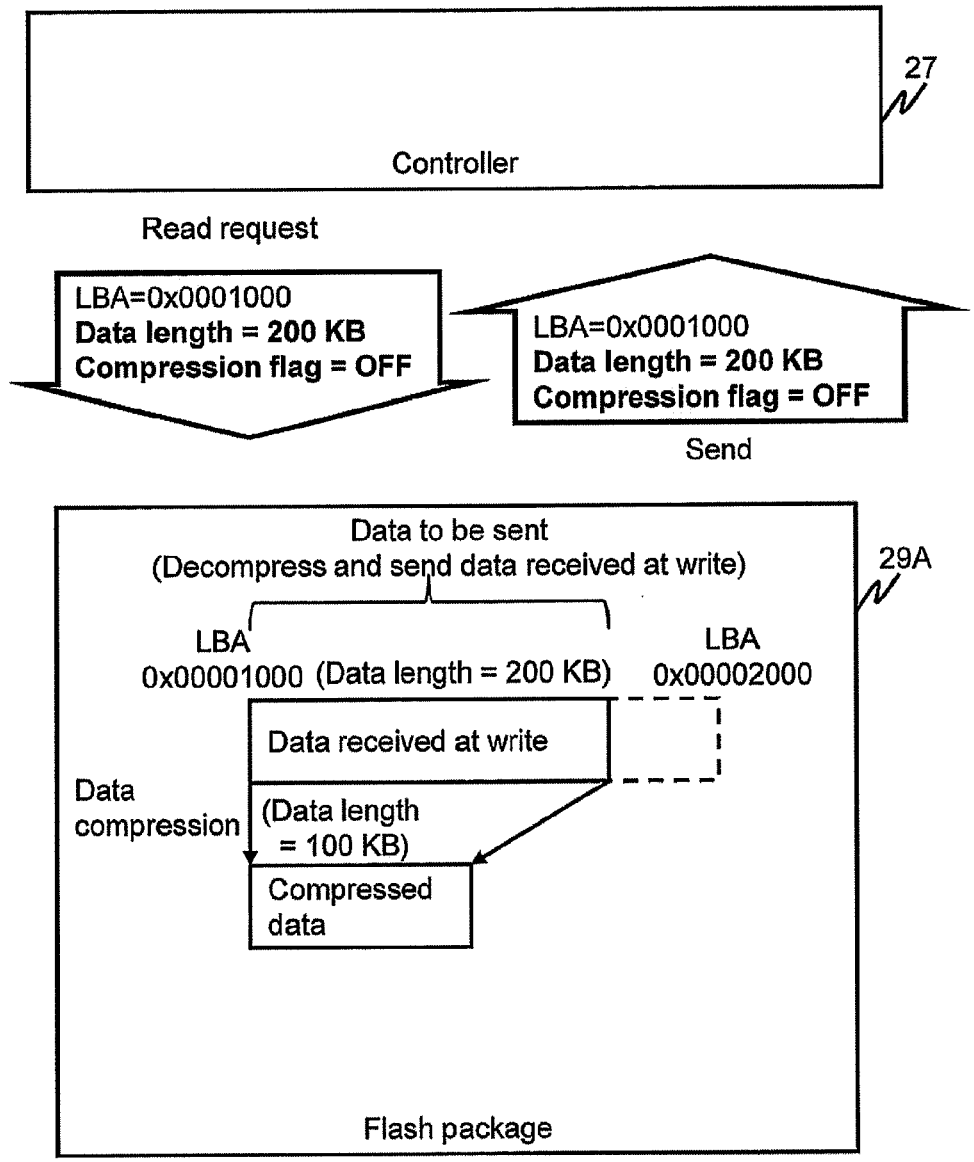
FIG. 7 shows an overview of a process in which a flash package 29A decompresses compressed data and sends the compressed data to a controller 27.
Figure 8:
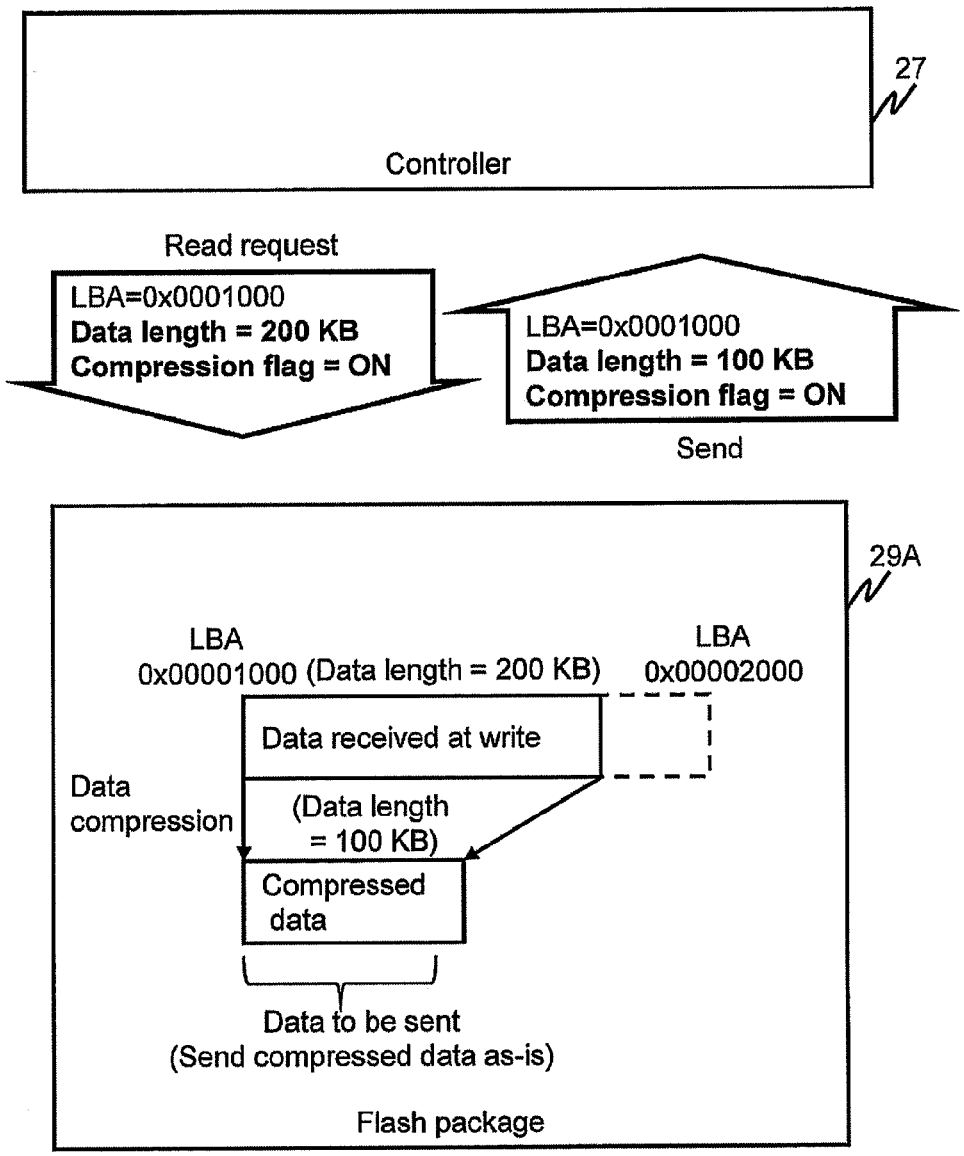
FIG. 8 shows an overview of a process in which the flash package 29A sends compressed data to the controller 27 without performing decompression.

Furthermore, the flash package 29A in this example can decompress compressed data and send this data to the controller 27, or can send the compressed data to the controller 27 as-is without decompressing this data. FIGS. 7 and 8 are diagrams showing examples of a method for selectively switching between decompressing and not decompressing the compressed data before sending this data. Specifically, whether to decompress or not to decompress the compressed data is decided in accordance with whether the "compressed data send flag (hereinafter, referred to as the compression flag)" capable of being included in the read request from the controller 27 is ON or OFF. In a case where the compression flag is OFF, the flash package 29A decompresses the compressed data and sends this data to the controller 27, and in a case where the compression flag is ON, the flash package 29A sends the compressed data to the controller 27 without decompressing this compressed data.

FIG. 7 shows an overview of the processing by which the flash package 29A decompresses the compressed data and sends this data to the controller 27.

In a case where "OFF" is included, the compressed data is decompressed and sent to the controller 27. As a result of this, in the example shown in the drawing, 100 KB of compressed data is decompressed and sent to the controller 27 as 200 KB of data.

FIG. 8 shows an overview of the processing by which the flash package 29A sends the compressed data to the controller 27 without decompressing this compressed data.

In a case where "ON" is included, the compressed data is sent to the controller 27 without being decompressed. As a result of this, in the example shown in the drawing, 100 KB of compressed data is sent to the controller 27 as 100 KB of data without being decompressed.

Figure 9:
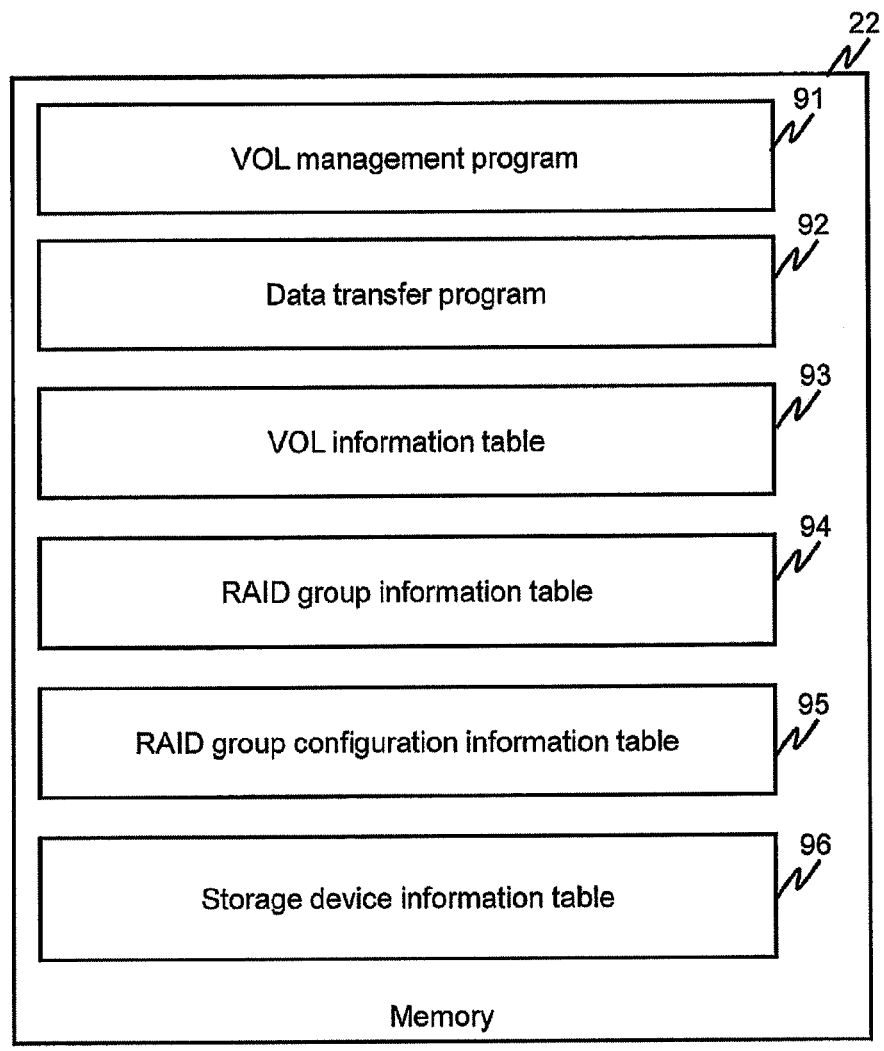
FIG. 9 shows an example of programs and information stored in a memory 22.

FIG. 9 shows an example of programs and information stored in the memory 22.

The memory 22 stores a VOL management program 91, a data transfer program 92, a VOL information table 93, a RAID group information table 94, a RAID group configuration information table 95, and a storage device information table 96.

The VOL management program 91 is for managing a VOL of the storage system 20.

The data transfer program 92 is for sending data to another storage system coupled to the storage system 20.

The VOL information table 93 is for managing information related to a VOL.

The RAID group information table 94 is for managing information related to a RAID group.

The RAID group configuration information table 95 is for managing information related to the configuration of the RAID group.

The storage device information table 96 is for managing information related to a storage device comprising a RAID group.

Figure 10:
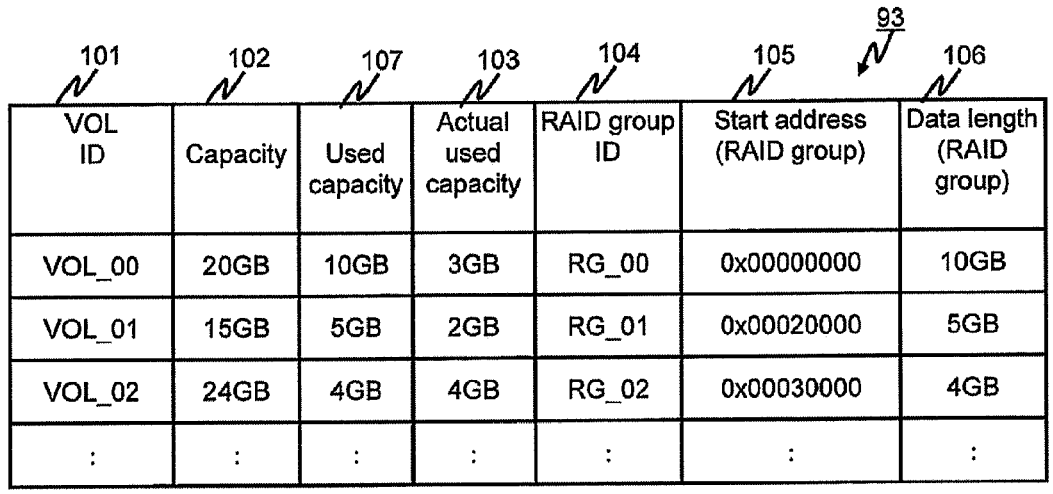
FIG. 10 shows an example of a VOL information table 93.

FIG. 10 shows an example of the VOL information table 93.

The VOL information table 93 associatively stores a VOL ID 101, a capacity 102, a used capacity 107, an actual used capacity 103, a RAID group ID 104, a start address 105, and a data length 106 for each VOL.

The VOL ID 101 is information for identifying a VOL.

The capacity 102 is information showing the capacity of the VOL.

The used capacity 107 is information showing the total amount of data stored in the VOL.

The actual used capacity 103 is information showing the total capacity of a physical device, which a storage device is actually using to store the data stored in the VOL.

The RAID group ID 104 is information for identifying a RAID group, which constitutes the basis of the VOL.

The start address 105 is information showing the start address of the VOL in the storage space of the RAID group.

The data length 106 is information showing the length of the data in the VOL in the storage space of the RAID group. A VOL may also be clipped from a portion of the storage space of the RAID group. Therefore, the location of the VOL in the storage space of the RAID group is understood from the start address 105 and the data length 106. Furthermore, because the data length 106 is substantially the same as the used capacity 107, either the data length 106 or the used capacity 107 may be eliminated.

Figure 11:
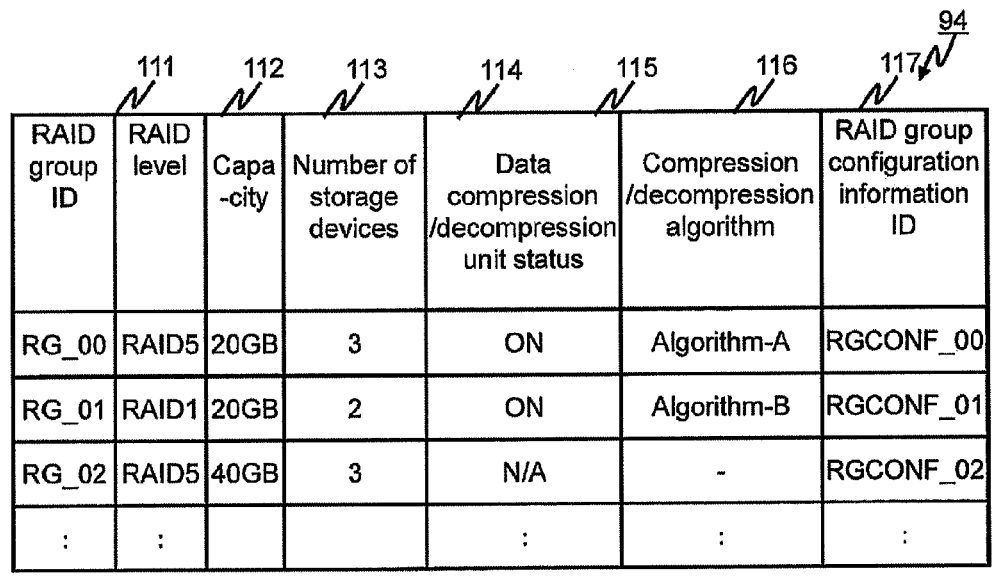
FIG. 11 shows an example of a RAID group information table 94.

FIG. 11 shows an example of the RAID group information table 94.

The RAID group information table 94 associatively stores, for each RAID group 104, a RAID group ID 111, a RAID level 112, a capacity 113, a number of storage devices 114, a data compression/decompression unit status 115, a compression/decompression algorithm 116, and a RAID group configuration information ID 117.

The RAID group ID 111 is information for identifying a RAID group.

The RAID level 112 is information showing the RAID level of the RAID group.

The capacity 113 is information showing the capacity of the RAID group.

The number of storage devices 114 is information showing the number of storage devices comprising the RAID group.

The data compression/decompression unit status 115 is information showing whether or not the data compression/decompression unit 34 of each storage device comprising the RAID group is operating. "ON" shows a state in which the data compression/decompression unit is operating. "N/A" shows a state in which the data compression/decompression unit 34 is not operating, or a state in which the storage device does not comprise a data compression/decompression unit 34.

The compression/decompression algorithm 116 shows an algorithm of the data compression and decompression programs of the data compression/decompression unit. A case in which the same character string is registered shows that the compression/decompression algorithms are the same (or substantially the same because they are compatible).

The RAID group configuration information ID 117 is information for identifying the RAID group configuration information. This ID 117 can be used to identify a row in the RAID group configuration information table 95.

FIG. 12 shows an example of the RAID group configuration information table 95.

The RAID group configuration information table 95 associatively stores a RAID group configuration information ID 121, a location in RAID 122, and a storage device ID 123 for each piece of RAID group configuration information.

The RAID group configuration information ID 121 is information for identifying the RAID group configuration information.

The location in RAID 122 is a number showing the location in the RAID group of each storage device 123 comprising the RAID group. Multiple data units are stored in the RAID group in accordance with this number and the RAID level.

FIG. 13 shows an example of the storage device information table 96.

The storage device information table 96 associatively stores a storage device ID 131, a storage device type 132, a capacity 133, a compression/decompression unit status 134, and a compression/decompression algorithm 135 for each storage device.

The storage device ID 131 is information for identifying a storage device.

The storage device type 132 is information showing the type of storage device. As storage device types, for example, there are FPK (Flash PacKage), SAS (Serial Attached SCSI)-HDD, and SSD.

The capacity 133 is information showing the capacity of the storage device.

The compression/decompression unit status 134 shows the operational state of the compression/decompression unit status of each storage device. In the example shown in the drawing, only a storage device for which the storage device type 132 is FPK (Flash PacKage) comprises a data compression/decompression unit. "ON" shows a state in which the data compression/decompression unit is operating. Furthermore, "N/A" shows a state in which the data compression/decompression unit 34 is not operating, or a state in which the storage device does not comprise a data compression/decompression unit 34.

The compression/decompression algorithm 135 shows an algorithm of the data compression and decompression programs of the data compression/decompression unit.

Furthermore, the collection of data compression/decompression unit states, and the switching of the data compression/decompression unit between "ON" and "N/A", for example, can be performed by extending the SCSI (Small Computer System Interface) commands "Mode Sense" and "Mode Select".

Figure 14:
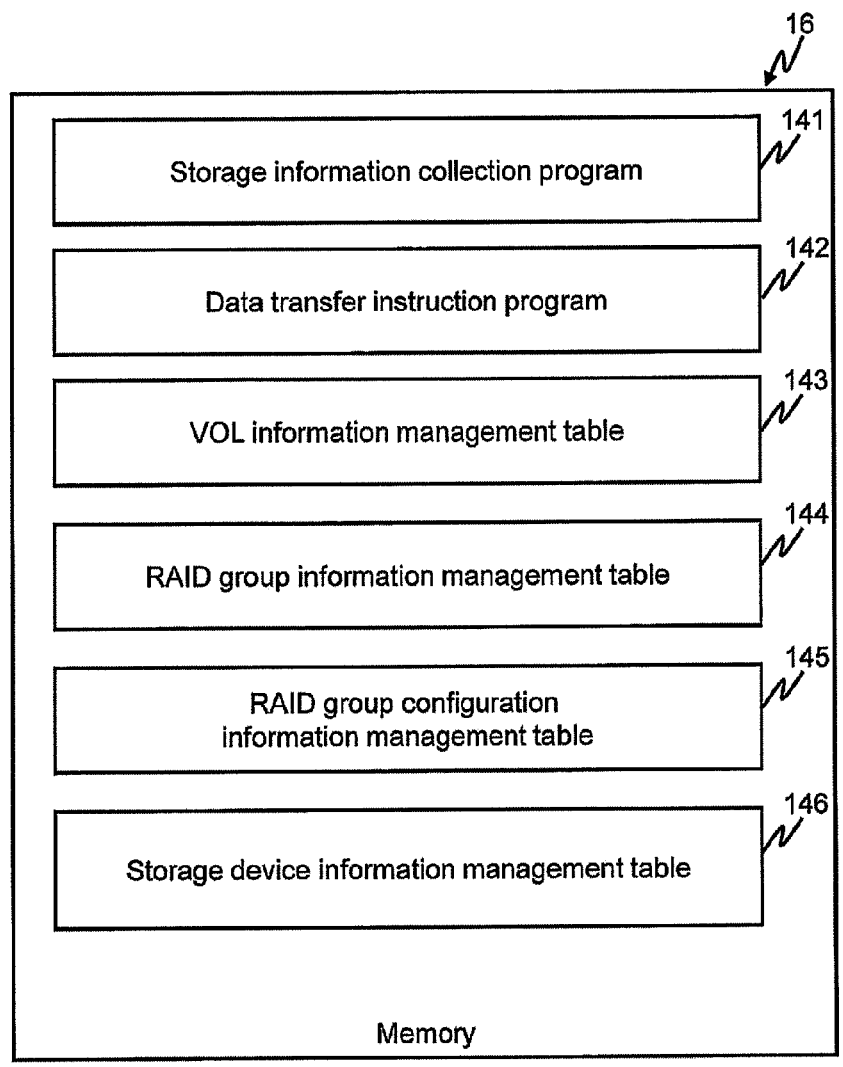
FIG. 14 shows an example of programs and information stored in a memory 16.

FIG. 14 shows an example of the programs and information stored in the memory 16.

The memory 16 stores a storage information collection program 141, a data transfer instruction program 142, a VOL information management table 143, a RAID group information management table 144, a RAID group configuration information management table 145, and a storage device information management table 146.

The storage information collection program 141 is for collecting storage system 20 information (information of the various tables 93 through 96).

The data transfer instruction program 142 is for transferring data between storage systems 20. For example, the data transfer instruction program 142 displays a GUI (Graphical User Interface) screen (for example, refer to FIG. 23) required to transfer data. Then, the data transfer instruction program 142, upon receiving a data transfer instruction from the administrator via an input device, sends a data transfer instruction to the data transfer-source (and/or the data transfer-destination) storage system 20 in accordance with this instruction.

The VOL information management table 143 is for managing information related to a VOL of the storage system 20.

The RAID group information management table 144 is for managing information related to a RAID group of the storage system 20.

The RAID group configuration information management table 145 is for managing configuration information related to a RAID group of the storage system 20.

The storage device information management table 146 is for managing information related to a storage device.

Of the various programs and information described hereinabove, the configurations of the tables 143 through 146 are substantially the same as those of the tables 93 through 96 stored in the memory 22. That is, the tables 143 through 146 comprise the information of tables 93 through 96 collected from the respective storage systems, and the ID of the information collection-source storage system. Specifically, for example, as shown in FIG. 15, in addition to the information of table 93, table 143 also comprises the ID of the storage system, which is the source of the collected information (the storage system comprising the VOL).

Figures 15, 16:
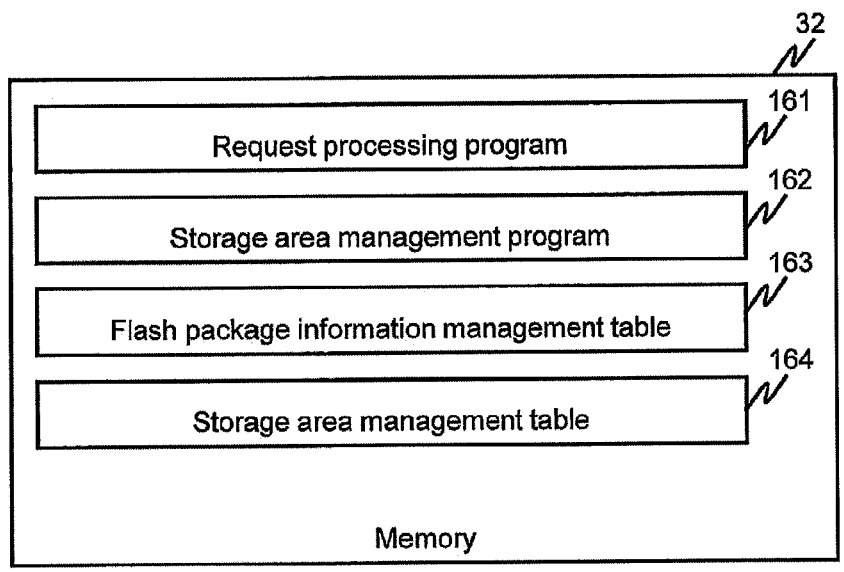
FIG. 15 shows an example of a VOL information management table 143.
FIG. 16 shows an example of programs and information stored in a memory 32.

FIG. 16 shows an example of the programs and information stored in a memory 32.

Memory 32 stores a request processing program 161, a storage area management program 162, a flash package information management table 163, and a storage area management table 164.

The request processing program 161 is for receiving various instructions from the storage system 20.

The storage area management program 162 is for storing the corresponding relationship between an LBA and a PBA in the storage area management table 164.

The flash package information management table 163 is for managing information with respect to each flash package.

The storage area management table 164 is for managing the corresponding relationship between an LBA, which is specified from the host computer 10, and a PBA in the storage device.

Figure 17:
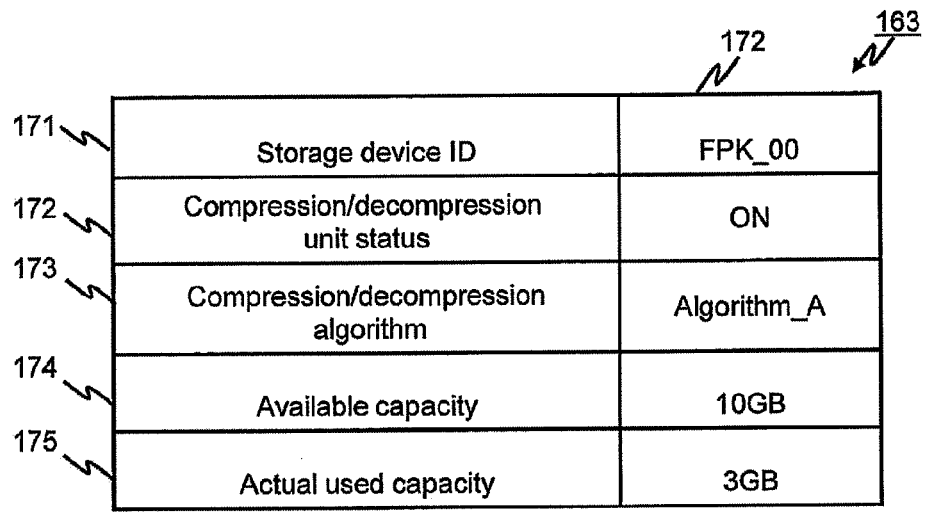
FIG. 17 shows an example of a flash package information management table 163.

FIG. 17 shows an example of the flash package information management table 163.

The flash package information management table 163 associatively stores a storage device ID 171, a compression/decompression unit status 172, a compression/decompression algorithm 173, an available capacity 174, and an actual used capacity 175 for each flash package.

The storage device ID 171 is information for identifying a flash package.

The compression/decompression unit status 172 is information showing the state of the data compression/decompression unit of the flash package.

The compression/decompression algorithm 173 is information showing the algorithm of the data compression/decompression program of the data compression/decompression unit.

The available capacity 174 is information showing all the capacity of the flash package, which is capable of being used.

The actual used capacity 175 is information showing the capacity, which the flash package is actually using.

Furthermore, the flash package 29A, for example, can acquire this information (171 through 175) by extending the SCSI command "Mode Sense".

Figure 18:
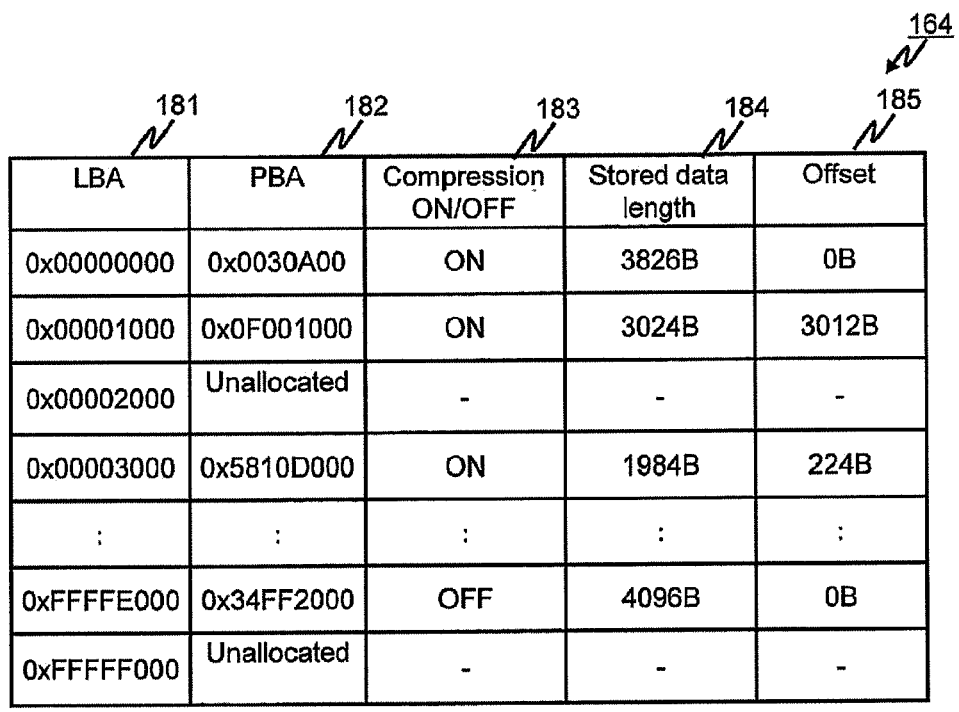
FIG. 18 shows an example of a storage area management table 164.

FIG. 18 shows an example of the storage area management table 164.

The storage area management table 164 associatively stores a LBA 181, a PBA 182, a compression ON/OFF 183, a stored data length 184, and an offset 185 for each LBA.

The LBA 181 is information showing an address specified from the host computer 10.

The PBA 182 is information showing the physical area into which data identified in accordance with the LBA is written to the flash package 29A.

The compression ON/OFF 183 is information showing whether the data to be written to the flash package 29A is compressed or not. "ON" shows the state in which the data is compressed. "OFF" shows the state in which the data is not compressed.

The stored data length 184 is information showing the length of the data in the flash package 29A with respect to the data, which was sent from the host computer 10. In a case where the compression ON/OFF 183 is "ON", the post-compression data length is stored in the stored data length 184. Typically, the stored data length 184 is shorter than the data length of the data specified by the LBA.

The offset 185 is information showing the amount of offset inside a page when data identified in accordance with the LBA is written to the flash package 29A. The data specified by the LBA is written to a physical page comprising the flash package 29A, but there may be case in which this data is not be written from the top of this physical page. The offset 185, for example, is information used in processing for equalizing the write frequency for each cell inside a page.

Figure 19:
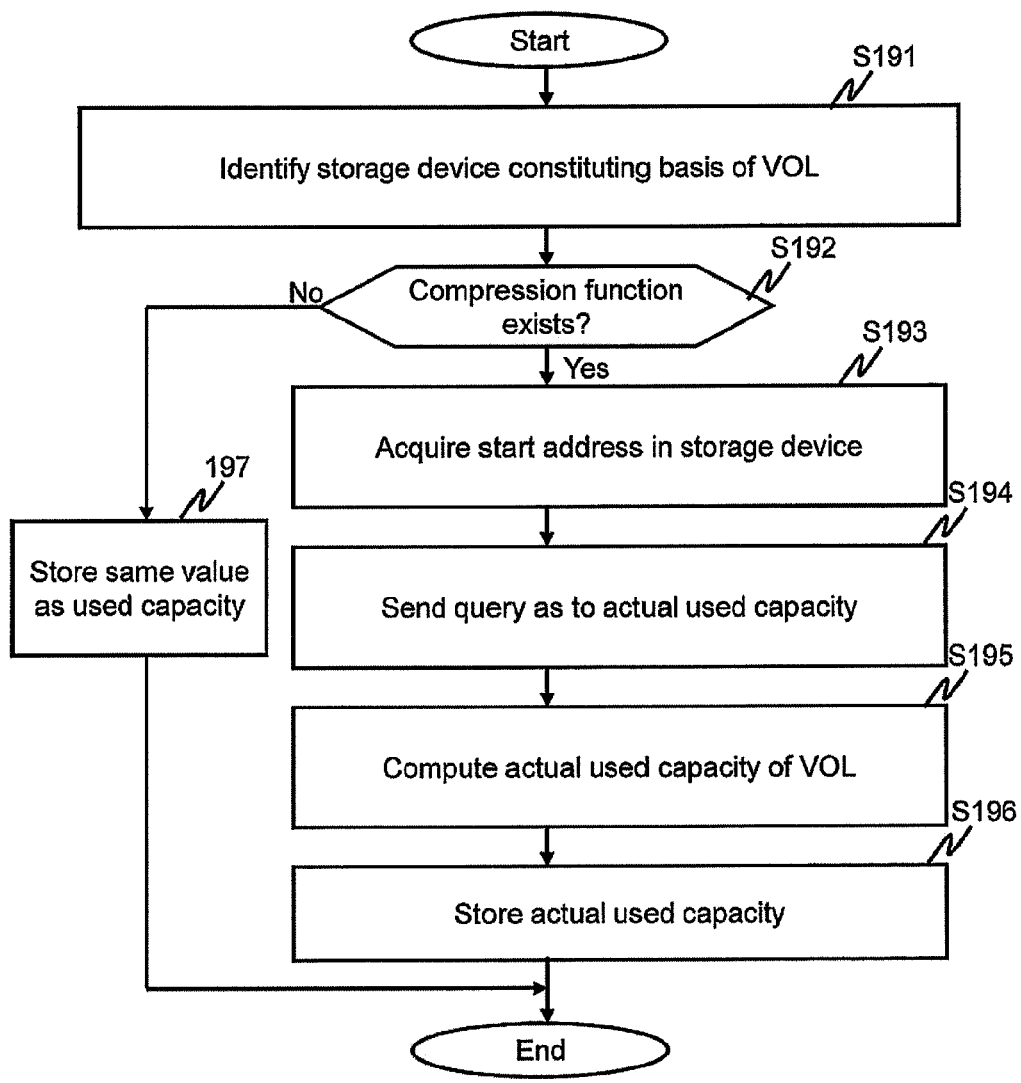
FIG. 19 shows an example of the flow of processing performed by a VOL management program 91 in the controller 27.

FIG. 19 shows an example of the flow of processing executed by the VOL management program 91 in the controller 27.

Since the actual used capacity of the VOL (the amount of data, which has been written to the storage device on which the VOL is based) is unknown when data is not actually compressed, the following processing in accordance with the VOL management program 91 becomes necessary. In a case where a prescribed event has occurred (for example, a case where an instruction has been received from the administrator, and/or a case where a fixed period of time has elapsed after the recent execution of the processing of FIG. 20), the VOL management program 91 updates the actual used capacity 103 of the VOL information table 93 for each VOL. This processing will be explained below using a single VOL as an example.

The VOL management program 91 references the RAID group information table 94, the RAID group configuration information table 95, and the storage device information table 96, and identifies the storage devices, which constitute the basis of the VOL (S191).

The VOL management program 91 checks whether or not the storage devices identified in S191 comprise a function for compressing data (S192).

In a case where the storage devices comprise a compression function (S192: YES), the VOL management program 91 translates the start address (RAID group) 105 to a start address (PBA) in the storage devices (S193). The post-translation start address is the start address of a portion of the storage area of the storage devices corresponding to the VOL.

The VOL management program 91 sends an actual used capacity query specifying the storage device start address (the post-translation start address of S193) and a data length to each storage device comprising the RAID group (S194). The portion of the storage area denoted by the start address and data length specified here is the portion corresponding to the VOL.

The VOL management program 91 computes the actual used capacity of the VOL based on the actual used capacity acquired from the respective storage devices in response to the query of S194 (S195). Typically, the actual used capacity of the VOL is obtained by totaling multiple actual used capacities.

The VOL management program 91 writes the actual used capacity computed in S195 to table 93 as the actual used capacity 103 corresponding to the VOL (S196).

Alternatively, in a case where the storage devices do not comprise a compression function (S192: NO), the VOL management program 91 stores the same value as that of the used capacity 107 as the actual used capacity 103 (S197).

Figure 20:
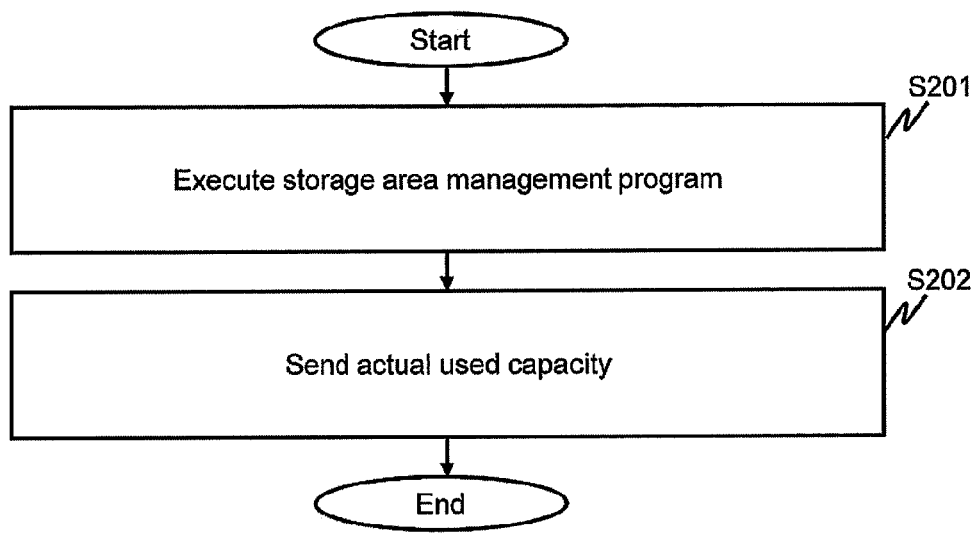
FIG. 20 shows an example of the flow of processing performed by a request processing program 161 in the flash package 29A.

FIG. 20 shows an example of the flow of processing performed by the request processing program 161 in the flash package 29A.

The request processing program 161 receives the actual used capacity query sent from the VOL management program 91 in S194, and performs the following processing.

The request processing program 161 executes the storage area management program 162 (S201).

The request processing program 161 sends the actual used capacity computed in accordance with the storage area management program 162 to the VOL management program 91 (S202).

Figure 21:
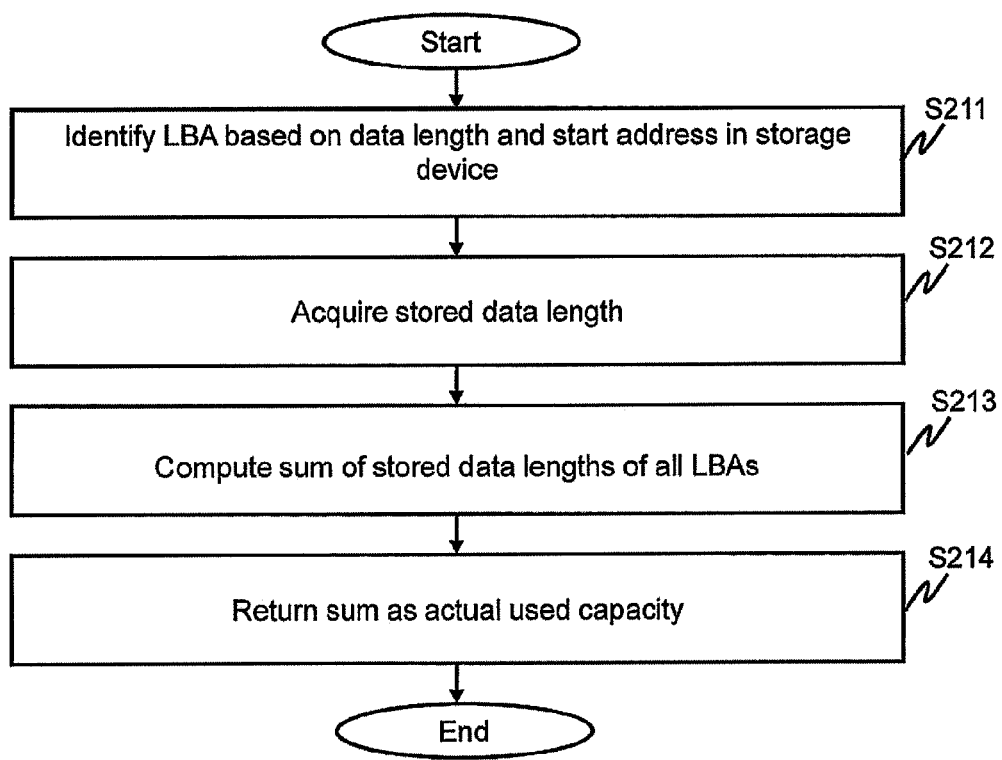
FIG. 21 shows an example of the flow of processing performed by a storage area management program 162 in the flash package 29A.

FIG. 21 shows an example of the flow of processing performed by the storage area management program 162 in the flash package 29A.

The storage area management program 162 identifies the range of LBAs corresponding to the start address and the data length included in the above-mentioned query from among the range of LBAs in this flash package (S211).

The storage area management program 162 acquires multiple stored data lengths 184 respectively corresponding to multiple LBAs belonging to the range of LBAs identified in S211 from the storage area management table 164 (FIG. 18) (S212).

The storage area management program 162 computes the sum of the multiple stored data lengths 184 acquired in S212 (S213).

The storage area management program 162 provides the value computed in S213 to the request processing program 161 as the actual used capacity 175 (S214).

Figure 22:
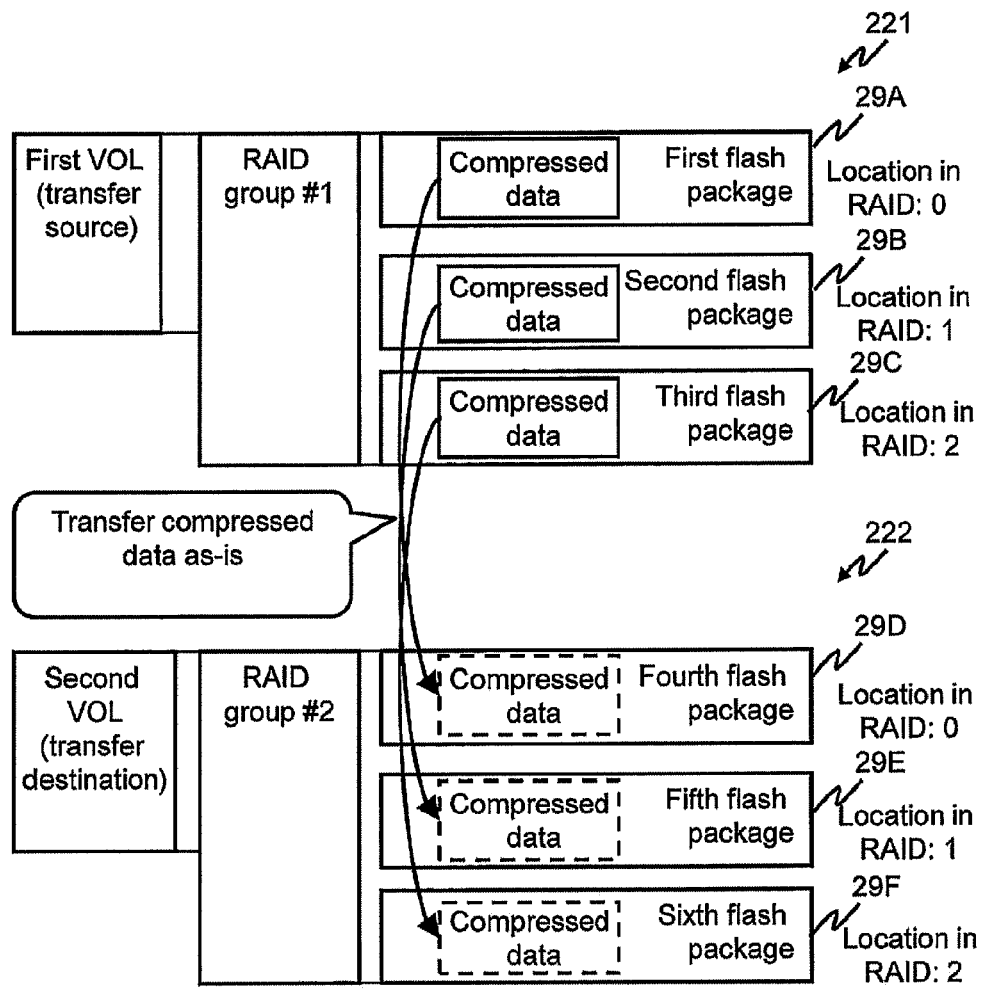
FIG. 22 shows an overview of processing in a remote copy system related to Example 1.

FIG. 22 shows an overview of the processing of the remote copy system related to Example 1.

In Example 1, compressed data inside a first storage system 20 is transferred to a second storage system 20 as-is without being decompressed. Because compressed data is transferred from the first storage system 20 to the second storage system 20, the amount of data transferred between the storage systems can be reduced more than in a case where uncompressed data (typically, compressed data, which has been decompressed) is transferred.

In the example shown in the drawing, the first storage system 221 comprises a RAID group #1, which comprises a first flash package 29A, a second flash package 29B, and a third flash package 29C. Then, a first VOL is created based on the storage space formed by this RAID group #1.

The location in RAID in RAID group #1 of the first flash package 29A is "0", the location in RAID in RAID group #1 of the second flash package 29B is "1", and the location in RAID in RAID group #1 of the third flash package 29C is "2". The location in RAID of each flash package is managed in accordance with the RAID configuration information table 95. Furthermore, the "location in RAID" denotes a logical location rather than a physical location. For example, in a case where a RAID group of RAID 5 is configured, multiple data units (data and parity) are dispersibly stored in the flash packages, and the dispersibility of the multiple data units with respect to the multiple flash packages 29A through 29C is assured in accordance with the "location in RAID".

Also, the second storage system 222 comprises a RAID group #2, which comprises a fourth flash package 29D, a fifth flash package 29E, and a sixth flash package 29F, and a second VOL is created based on the storage space formed by this RAID group #2. The location in RAID in RAID group #2 of the fourth flash package 29D is "0", the location in RAID in RAID group #2 of the fifth flash package 29E is "1", and the location in RAID in RAID group #2 of the sixth flash package 29F is "2".

When performing a remote copy of compressed data from the first storage system 221 to the second storage systems 222, the remote copy must be performed between flash packages for which the locations in RAID are identical. This is because performing a remote copy between flash packages for which the locations in RAID are not identical destroys the dispersibility of the multiple data units with respect to the multiple flash packages in the RAID group, making it impossible to restore the data.

In the example shown in the drawing, compressed data is transferred from the first flash package 29A to the fourth flash package 29D, from the second flash package 29B to the fifth flash package 29E, and from the third flash package 29C to the sixth flash package 29F. In accordance with this, the dispersibility of the multiple data units with respect to the multiple flash packages in the RAID group is also assured at the transfer destinations.

In a remote copy related to Example 1, all of the following conditions must be met:
(Condition 1) The RAID configuration (RAID level and number of storage devices) of the RAID group (hereinafter, may be referred to as the "transfer-source RAID group") constituting the basis of the first VOL (transfer-source VOL) and the RAID configuration of the RAID group (hereinafter, may be referred to as the "transfer-destination RAID group") constituting the basis of the second VOL (transfer-destination VOL) are the same;
(Condition 2) The location in RAID of the transfer-source storage device (storage device, which is the source of the data transfer) in the transfer-source RAID group and the location in RAID of the transfer-destination storage device (storage device, which is the destination of the data transfer) in the transfer-destination RAID group are the same;
(Condition 3) The type of compression/decompression unit (for example, algorithm) of the transfer-source storage device and the type of compression/decompression unit of the transfer-destination storage are the same; and
(Condition 4) The copy is one in which a data read from the transfer-source VOL and a data write to the transfer-destination VOL are not performed, that is, it is a direct data copy from the respective transfer-source storage devices in the transfer-source RAID group to the respective storage devices in the transfer-destination RAID group.

Figure 23:
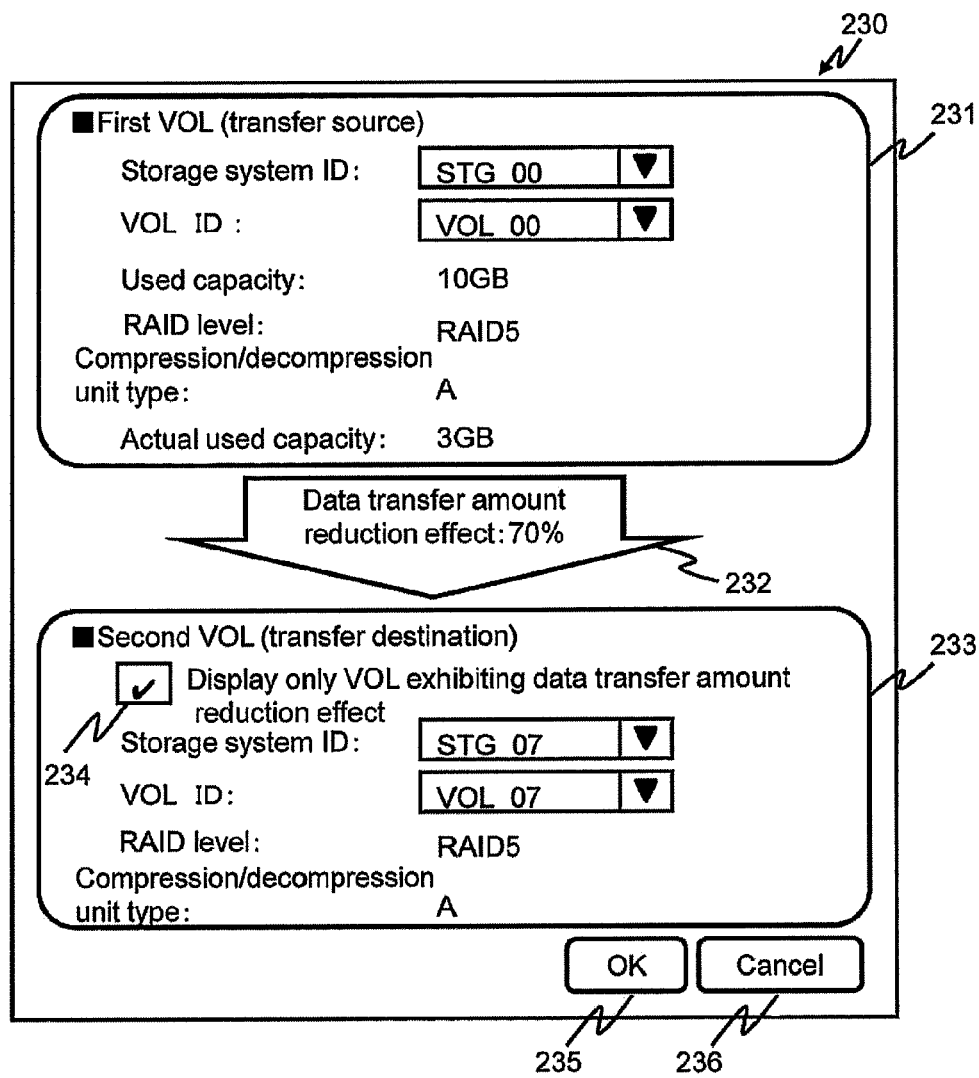
FIG. 23 shows an example of a user setting screen 230.

FIG. 23 shows an example of a user setting screen 230.

The user setting screen 230 is a screen (for example, a GUI screen) displayed on the display device (not shown in the drawing) of the management system 14. The user operates an input device (not shown in the drawing) to specify on the user setting screen 230 a first VOL, which will become the transfer source, and a second VOL, which will become the transfer destination.

The user setting screen 230 comprises a first VOL specification area 231 for specifying the first VOL, and a second VOL specification area 233 for specifying the second VOL. The user setting screen 230, for example, is displayed by the data transfer program 92.

When a storage system ID and a VOL ID are specified in the first VOL specification area 231, information related to the VOL corresponding to the specified ID is displayed in the first VOL specification area 231. As VOL-related information, a used capacity (107), a RAID level (112), a type of compression/decompression unit (116), and an actual used capacity (103) are displayed.

When the first VOL has been specified, second VOL candidates capable of being selected as the transfer destination (for example, a VOL having the same capacity as the capacity of the first VOL) are displayed in the second VOL specification area 233, for example, as a list in a pull-down menu. When a check is entered into a checkbox 234 at this time, only a data reduction effect VOL is selectably displayed in the second VOL specification area 233. Here, "data reduction effect VOL" is the VOL which meets (Condition 1) through (Condition 4) above, for example, a VOL, which meets all of the following conditions:
(a) a VOL based on the RAID group comprising storage devices, which are capable of receiving and storing compressed data from the respective transfer-source storage devices of the transfer-source RAID group constituting the basis of the first VOL; and
(b) the respective storage devices comprising the RAID group described in (a) are able to decompress the compressed data.

When the data reduction effect VOL is displayed in the second VOL specification area 233, the extent of this reduction effect is displayed as indicated by a reference sign 232. In the drawing, "data transfer amount reduction effect 70%" is displayed, indicating that the amount of data has been reduced by 70 percent compared to a case in which uncompressed data is transferred. In the example in the drawing, the used capacity is 10 GB but the actual used capacity is 3 GB, signifying that the data transfer amount reduction effect is 70%. Furthermore, as a "data amount reduction effect", the bandwidth (MB/sec and so forth) of the path used in the transfer may be stored and displayed as the data transfer rate.

When the OK button 235 is pressed, compressed data is remote copied from the transfer-source RAID group (the RAID group constituting the basis of the first VOL specified on the user setting screen 230) to the transfer-destination RAID group (the RAID group constituting the basis of the second VOL specified on the user setting screen 230). Alternatively, when the Cancel button 236 is pressed, the first VOL (transfer source) and the second VOL (transfer destination) specifications displayed on the user setting screen 230 are cancelled.

Figure 24:
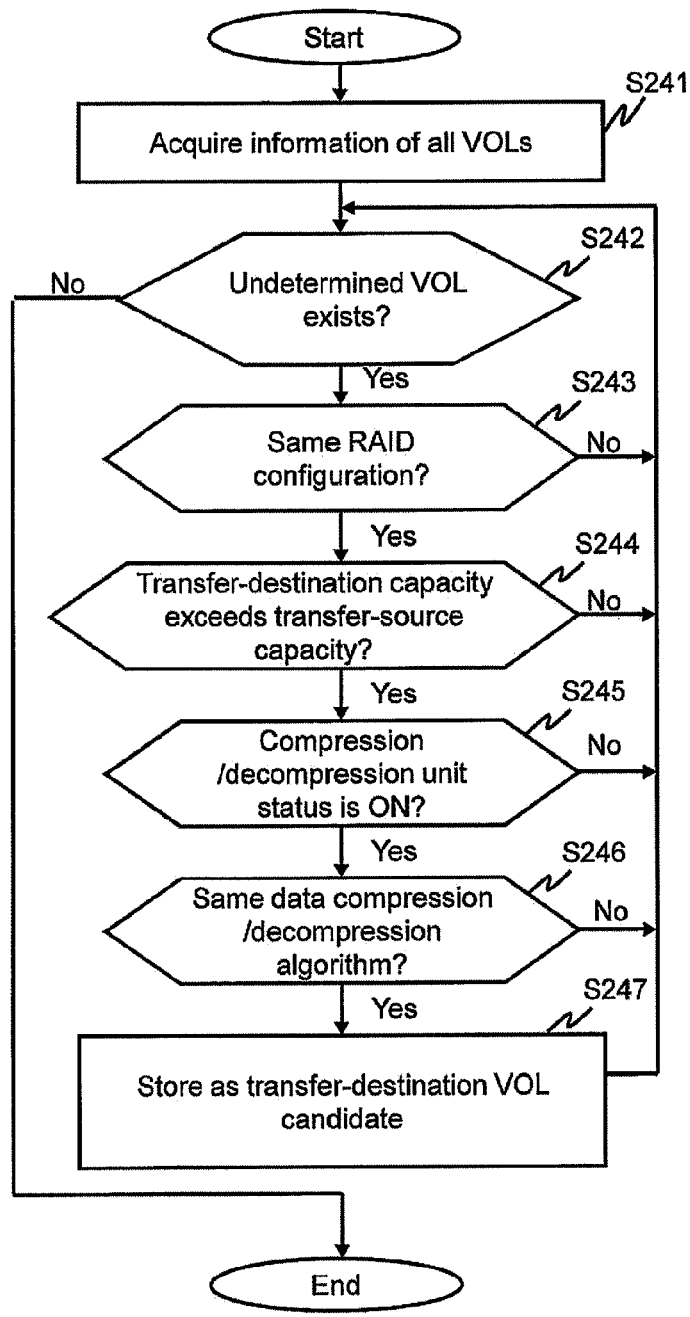
FIG. 24 shows an example of the flow of processing performed by a data transfer instruction program 142 in a management system 14.

FIG. 24 shows an example of the flow of processing performed by the data transfer instruction program 142 in the management system 14.

The data transfer instruction program 142 executes this processing flow in a case where a check has been entered into the checkbox 234 in the user setting screen 230.

The data transfer instruction program 142 acquires the information of all the VOLs from the VOL information table 93 (S241).

The data transfer instruction program 142 determines whether or not there are any undetermined VOLs (S242). Determined here indicates a determination as to whether or not a VOL is suitable to serve as a transfer-destination VOL for which a data reduction effect can be expected.

In a case where there are no undetermined VOLs (S242: NO), the data transfer instruction program 142 ends the processing.

In a case where an undetermined VOL exists (S242: YES), the data transfer instruction program 142 selects one VOL from among one or more undetermined VOLs, references the RAID group information table 94 (RAID level 112), and checks whether or not the RAID configuration (the RAID level 112 here) of the RAID group constituting the basis of this VOL (the "determination-target VOL" in the explanation of FIG. 24) is the same as the RAID configuration (the RAID level 112) of the RAID group constituting the basis of the first VOL (S243).

In a case where the RAID levels are not the same (S243: NO), the data transfer instruction program 142 performs the processing of S242 for the undetermined VOL.

In a case where the RAID levels are the same (S243: YES), the data transfer instruction program 142 references the VOL information table (capacity 102) and checks whether or not the capacity of the determination-target VOL is equal to or larger than the capacity of the first VOL (S244).

In a case where the capacity of the determination-target VOL is not equal to or larger than the capacity of the first VOL (S244: NO), the data transfer instruction program 142 performs the processing of S242 for the undetermined VOL.

In a case where the capacity of the determination-target VOL is equal to or larger than the capacity of the first VOL (S244: YES), the data transfer instruction program 142 references the RAID group information table 94 (compression/decompression unit status 115) and checks whether or not the data compression/decompression unit of the RAID group constituting the basis of the determination-target VOL is ON (S245).

In a case where the data compression/decompression unit is not ON (S245: NO), the data transfer instruction program 142 performs the processing of S242 for the undetermined VOL. Furthermore, in a case where the data compression/decompression unit in not ON (S245: NO), for example, the data transfer instruction program 142 can issue an instruction to the VOL management program 91 to turn the data compression/decompression unit ON.

In a case where the data compression/decompression unit is ON (S245: YES) or has been turned ON, the data transfer instruction program 142 references the RAID group information table 94 (compression/decompression algorithm 116) and checks whether the RAID group constituting the basis of the first VOL and the RAID group constituting the basis of the determination-target VOL comprise the same data compression/decompression unit (S246).

In a case where the data compression/decompression units are not the same (S246: NO), the data transfer instruction program 142 performs the processing of S242 for the undetermined VOL.

In a case where the compression/decompression units are the same (S246: YES), the data transfer instruction program 142 stores the determination-target VOL as a transfer-destination VOL candidate (S247).

The data transfer instruction program 142 displays information related to the transfer-destination VOL candidate stored in S247 in the second VOL specification area 233.

Figure 25:
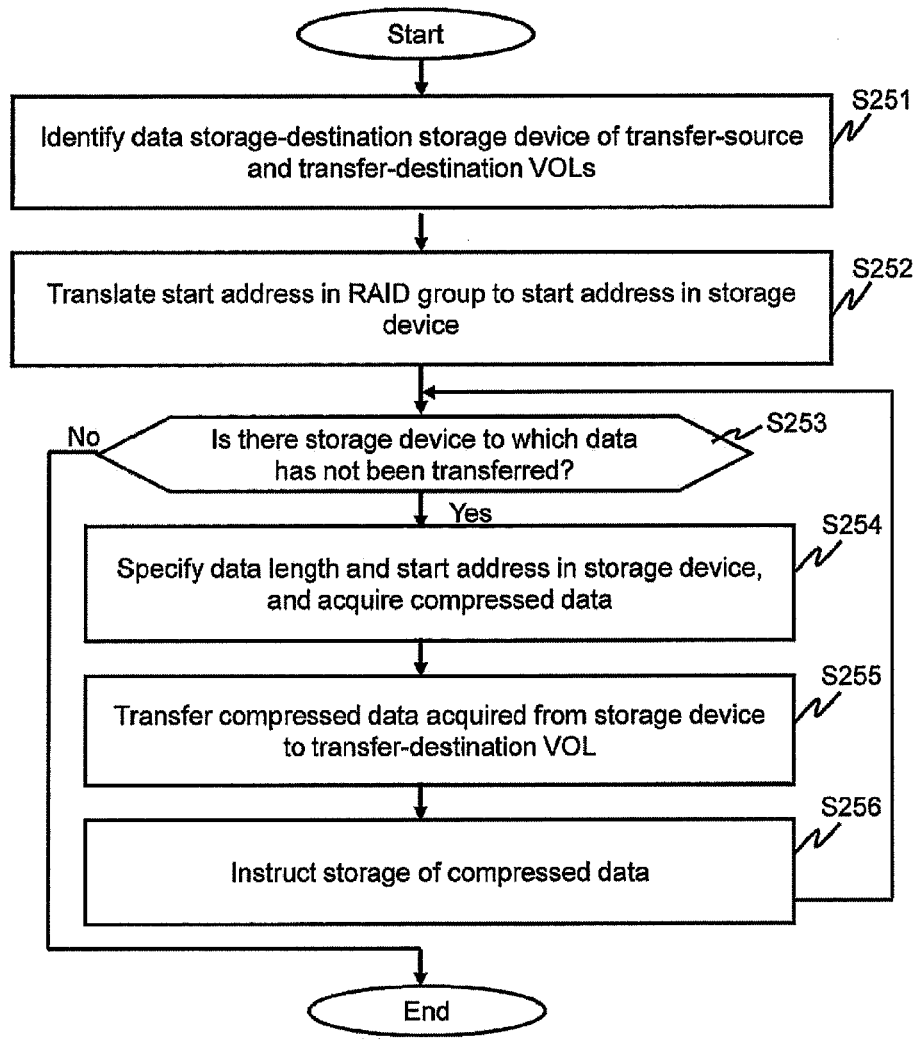
FIG. 25 shows an example of the flow of processing performed by a data transfer program 92 in the controller 27.

FIG. 25 shows an example of the flow of processing performed by the data transfer program 92 in the controller 27.

The data transfer program 92, in a case where the OK button 235 on the user setting screen 230 has been pressed, receives an instruction from the data transfer instruction program 142, and starts this processing flow in accordance with this instruction. In accordance with this processing flow performed by the data transfer program 92, a compressed data remote copy is realized between the RAID groups of different storage systems.

The data transfer program 92 references the RAID group information table 94, the RAID group configuration information table 95, and the storage device information table 96, and identifies the respective storage devices comprising the RAID group, which constitutes the basis of the first VOL (transfer-source VOL), and the respective storage devices comprising the RAID group, which constitutes the basis of the second VOL (transfer-destination VOL) (S251).

The data transfer program 92 translates the start address 105 (RAID group) to the start addresses of the storage devices for both the first VOL and the second VOL (S252).

The data transfer program 92 checks whether or not there is a storage device to which data has not been transferred (S253).

In a case where a storage device to which data has not been transferred does not exist (S253: NO), the data transfer program 92 ends the processing. This is because the data copy between the RAID groups has ended.

In a case where a storage device to which data has not been transferred exists (S253: YES), the data transfer program 92 sends a read request (a command which includes compression flag: ON) specifying the start address of the storage device and the data length to this storage device to which data has not been transferred, and in accordance with this, acquires compressed data from this storage device (S254).

Figure 27:
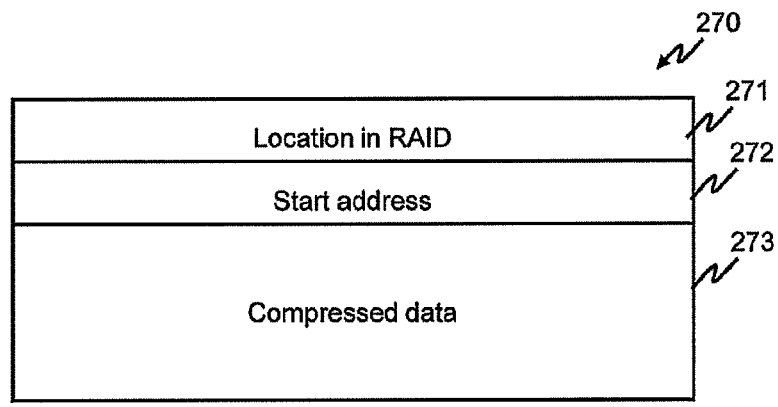
FIG. 27 shows an example of data being transferred between storage systems.

The data transfer program 92 transfers the location in RAID 122, the start address (RAID group) 105, and the compressed data acquired from the storage device to the controller of the storage system, which comprises the second VOL (hereinafter, "second controller" in the explanation of FIG. 25) (S255). The data group transferred in S255 is as shown in the example in FIG. 27. That is, the transferred data group 270 comprises the location in RAID 271, the start address (RAID group) 272, and the compressed data 273. The types of data included in the data group are not limited thereto.

The data transfer program 92 instructs the second controller to write the compressed data, which was transferred in S255, to the start address, which was transferred in S255, of the storage device corresponding to the location in RAID 122, which was transferred in S255 (S256). The second controller receives this instruction, and writes the compressed data, which was sent in S255, to the start address, which was notified in S255, of the storage device corresponding to the location in RAID 122, which was notified in S255. Furthermore, the second controller, in order to write the compressed data to the storage device, sends a write request having the compressed data as the write target to the storage device, and can control whether the write target is to be compressed or not. For example, the write request comprises the compression flag, and the controller inside the storage device controls whether or not to compress the write target using the compression/decompression unit in accordance with whether the compression flag is ON or OFF. For example, the second controller, upon writing the compressed data to the storage device, sends a write request in which the compression flag is OFF to this storage device. In accordance with this, the compressed data is stored in the storage device without being compressed (that is, compressed as-is).

In accordance with the sequence of processes in FIG. 25, a remote copy of compressed data is performed between RAID groups of different storage systems. In a case where the host computer sends to the storage system comprising the second VOL a read request specifying an LBA for the second VOL, which is the same as the LBA specified with respect to the first VOL, it is possible to read from the second VOL the same data as the data read by specifying the same LBA with respect to the first VOL. This is because the relationship between the LBA of the second VOL and the location in the RAID group is the same as the relationship between the LBA of the first VOL and the location in the RAID group.

Figure 26:
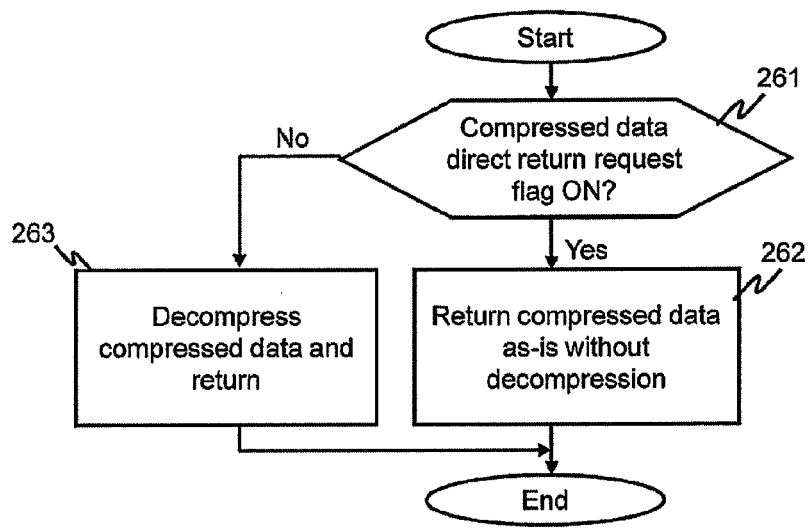
FIG. 26 shows an example of the flow of processing performed by the request processing program 161 with respect to a read request in the flash package 29A.

FIG. 26 shows an example of the flow of processing with respect to a read request issued by the request processing program 161 in the flash package 29A.

The flash package 29A, upon receiving a data read request, checks whether or not the compression flag included in the read request is "ON" (S261).

When the compression flag is "ON" (S261: YES), the flash package 29A sends the compressed data as-is without performing decompression (S262).

When the compression flag is "OFF" (S261: NO), the flash package 29A decompresses the compressed data using the compression/decompression unit and sends this data (S263).

Example 2

Example 2 will be explained hereinbelow. In so doing, the explanation will focus on the points of difference with Example 1, and explanations of the points in common with Example 1 will be either simplified or omitted.

Figure 28:
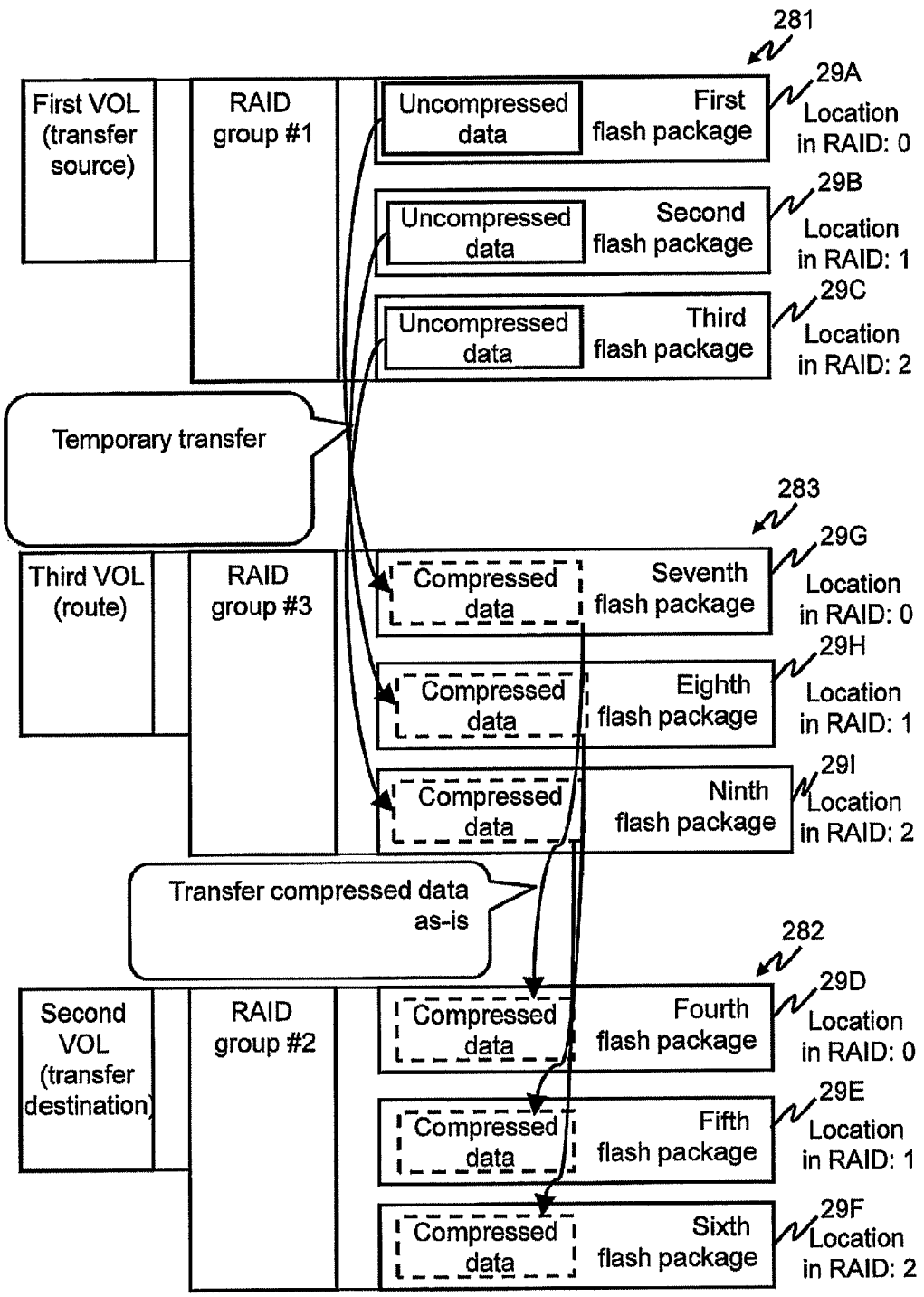
FIG. 28 shows an overview of processing in a remote copy system related to Example 2.

FIG. 28 shows an overview of the processing of a remote copy system related to Example 2.

In Example 2, data transferred from the RAID group constituting the basis of the first VOL to the RAID group constituting the basis of the second VOL is routed through a third VOL. In this example, the RAID group constituting the basis of the first VOL of a first storage system 281 does not comprise a compression/decompression unit. Therefore, data is transferred from the first VOL to the second VOL as-is without being compressed.

Consequently, in this example, a third VOL, which is based on a RAID group comprising a compression/decompression unit, becomes the relay point of this data in order to reduce the amount of data, which is transferred to the second storage system 20 comprising the second VOL. After compressing the data in the RAID group constituting the basis of the third VOL, the compressed data is transferred from this RAID group to the RAID group constituting the basis of the second VOL. That is, in this example, the third VOL is both a transfer source and a transfer destination.

This example, for example, makes it possible to reduce the amount of data transferred from the first storage system 20 to the second storage system 20 in a case where the first VOL and the third VOL are included in the first storage system 20, and the first storage system 20 is coupled to the second storage system 20 comprising the second VOL via a communication network (for example, a WAN (Wide Area network)).

In the example shown in the drawing, the first storage system 281 comprises a RAID group #1 comprising a first flash package 29A, a second flash package 29B, and a third flash package 29C. The first VOL is created on the basis of this RAID group #1.

The location in RAID of the first flash package 29A in the RAID group #1 is "0", the location in RAID of the second flash package 29B in the RAID group #1 is "1", and the location in RAID of the third flash package 29C in the RAID group #1 is "2".

As mentioned hereinabove, none of the flash packages 29A through 29C, which make up the RAID group #1, comprise a compression/decompression unit. For this reason, data, which has not been compressed (hereinafter, uncompressed data), is stored in the flash packages 29A through 29C.

A second storage system 282 comprises a RAID group #2 comprising a fourth flash package 29D, a fifth flash package 29E, and a sixth flash package 29F. A second VOL is created on the basis of the RAID group #2. The location in RAID of the fourth flash package 29D in the RAID group #2 is "0", the location in RAID of the fifth flash package 29E in the RAID group #2 is "1", and the location in RAID of the sixth flash package 29F in the RAID group #2 is "2". The flash packages 29D through 29F comprise compression/decompression units.

A third storage system 283 comprises a RAID group #3 comprising a seventh flash package 29G, an eighth flash package 29H, and a eighth flash package 29I. A third VOL is created on the basis of the RAID group #3. The location in RAID of the seventh flash package 29G in the RAID group #3 is "0", the location in RAID of the eighth flash package 29H in the RAID group #3 is "1", and the location in RAID of the ninth flash package 29I in the third RAID group is "2". The flash packages 29G through 29I comprise compression/decompression units.

Next, the flow of processing in a remote copy system in this example will be explained. As described hereinabove, in this example, when data is remote copied from the first storage system 281 to the second storage system 282, this data is routed through the third storage system 283 one time as was mentioned above.

The first VOL, the second VOL, and the third VOL must be VOLs based on RAID groups having the same RAID configuration. Also, the RAID group constituting the basis of the second VOL and the RAID group constituting the basis of the third VOL must comprise the same type of compression/decompression unit.

First, uncompressed data is transferred between flash packages having the same location in RAID. That is, uncompressed data is respectively transferred from the first flash package 29A to the seventh flash package 29G, from the second flash package 29B to the eighth flash package 29H, and from the third flash package 29C to the ninth flash package 29I. The flash packages 29G through 29I respectively create compressed data in accordance with compressing the transferred uncompressed data in the compression/decompression unit, and store the compressed data.

Next, the compressed data is transferred between flash packages having the same location in RAID. That is, the compressed data is transferred from the seventh flash package 29G to the fourth flash package 29D, from the eighth flash package 29H to the fifth flash package 29E, and from the ninth flash package 29I to the sixth flash package 29F.

In accordance with the above processing, data is remote copied to the RAID group constituting the basis of the second VOL by being routed through the RAID group constituting the basis of the third VOL from the RAID group constituting the basis of the first VOL. As described above, in a case where the second VOL and the third VOL exist in different storage systems, the data transferred between the storage systems is compressed data, thereby making it possible to reduce the amount of data being transferred between the storage systems.

Figure 29:
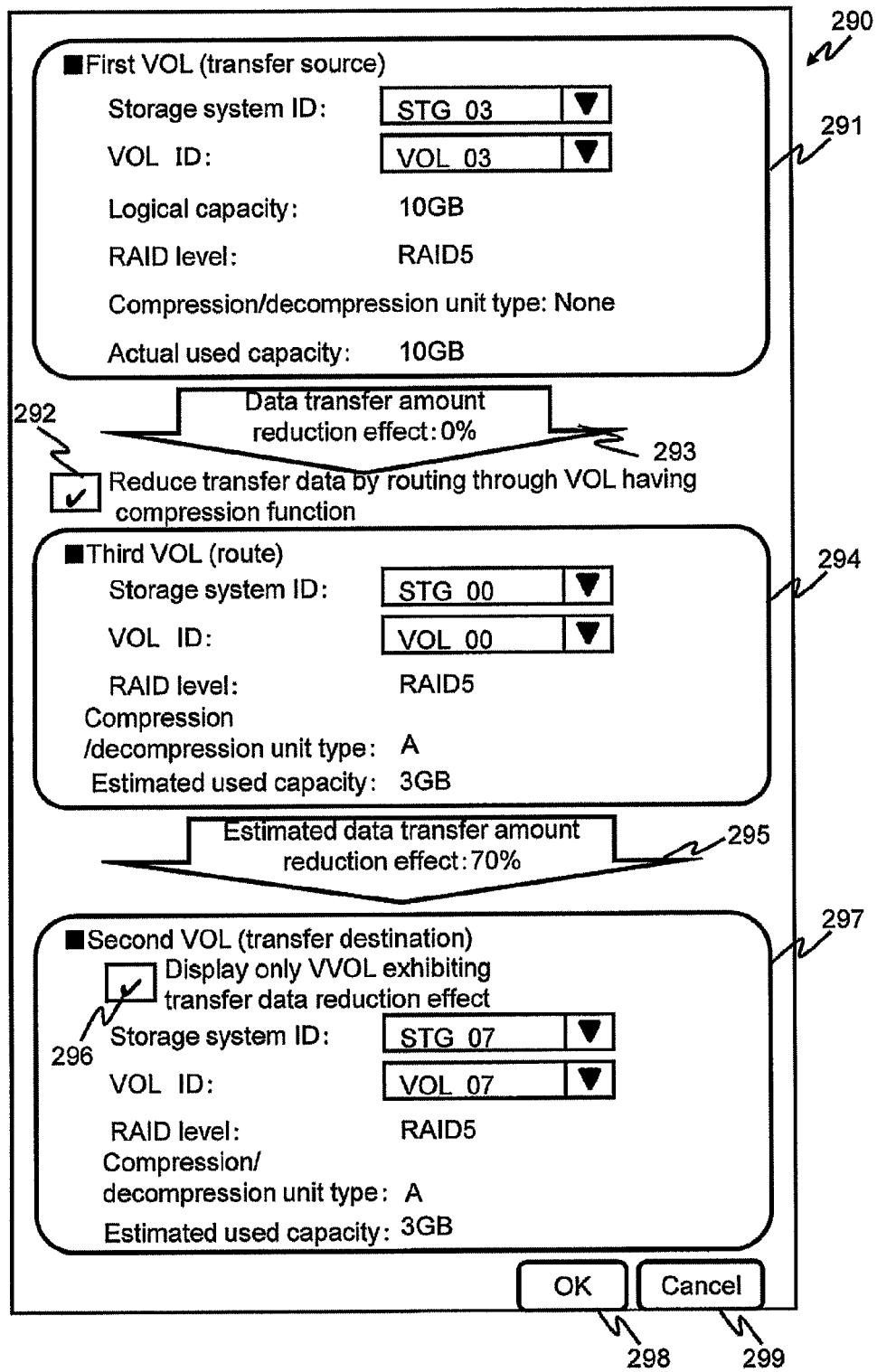
FIG. 29 shows an example of a user setting screen 290.

FIG. 29 shows an example of a user setting screen 290.

The user can configure the first through the third VOLs on the user setting screen 290. The user setting screen 290 comprises a third VOL specification area 294 for specifying a third VOL in addition to a first VOL specification area 291 and a second VOL specification area 297. The user setting screen 290 is displayed on the display device (not shown in the drawing) of the management system by the data transfer program 92.

The first VOL specification area 291 is the same as the first VOL specification area 231 related to Example 1.

When the first VOL is specified and a check entered into a checkbox 292 ("Reduce transfer data by routing through VOL having compression function"), information related to a VOL (third VOL candidate) capable of becoming the routing destination is displayed in the third VOL specification area 294. When a check is entered into the checkbox 292 at this time, an arrow 295 and the second VOL specification area 297 are displayed.

A third VOL, which will become the routing destination, is specified in the third VOL specification area 294. Specifically, the storage system ID and VOL ID of the third VOL are specified. The RAID level, the type of compression/decompression unit, and an estimated used capacity are displayed as third VOL-related information. Since the RAID group constituting the basis of the third VOL comprises a compression/decompression unit, the post-compression data size of the uncompressed data sent from the first VOL is displayed in the estimated used capacity. In the example shown in the drawing, it is estimated that the 10 GB of uncompressed data sent from the first VOL will be compressed to 3 GB in the third VOL.

In the second VOL specification area 297, a second VOL, which will become the transfer destination to which the compressed data is transferred from the third VOL, is selected. Specifically, the storage system ID and the VOL ID of the second VOL are specified. When a check is entered into a checkbox 296 at this time, only a "VOL exhibiting the transfer data reduction effect" can be selected in the second VOL specification area 297. That is, the third VOL specification area 294 is the specification area of the transfer-source VOL of the second VOL, and is equivalent to the first VOL specification area referred to in Example 1. A VOL capable of becoming the second VOL is decided in accordance with attributes (the RAID configuration of the RAID group constituting the basis of the transfer-source VOL and the compression/decompression unit type) related to the transfer-source VOL of the second VOL. In other words, all of the (Condition 1) through (Condition 4) described in Example 1 must also be met in Example 2, and the transfer-source VOL is the third VOL and the transfer-destination VOL is the second VOL.

Figure 30:
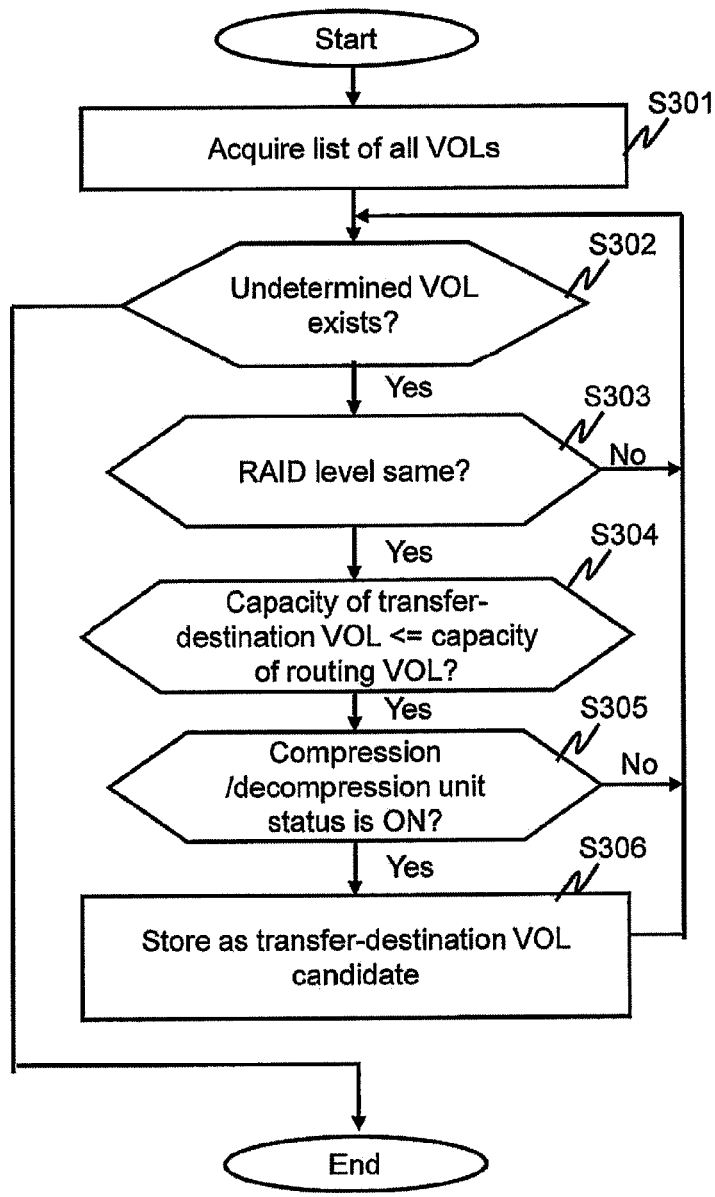
FIG. 30 shows an example of the flow of processing performed by the data transfer instruction program 142 in the management system 14.

FIG. 30 shows an example of the flow of processing performed by the data transfer instruction program 142 in the management system 14.

The data transfer instruction program 142, in a case where a check has been entered into the checkbox 292 in the user setting screen 290, executes this processing flow. In accordance with this processing flow, information related to a VOL, which is capable of becoming the third VOL, is displayed in the third VOL specification area 294.

The data transfer instruction program 142 acquires information on all the VOLs from the VOL information table 93 (S301).

The data transfer instruction program 142 determines whether or not an undetermined VOL exists (S302). Determined here indicates a determination as to whether or not a VOL is capable of becoming the transfer destination for pre-compression data from the first VOL.

In a case where there are no undetermined VOLs (S302: NO), the data transfer instruction program 142 ends the processing.

In a case where an undetermined VOL exists (S302: YES), the data transfer instruction program 142 selects one VOL from one or more undetermined VOLs, references the RAID group information table 94, and checks whether or not the RAID configuration (the RAID level 112 here) of the RAID group constituting the basis of this VOL (the "determination-target VOL" in the explanation of FIG. 30) is the same as the RAID configuration (the RAID level 112) of the RAID group constituting the basis of the first VOL (S303).

In a case where the RAID levels are not the same (S303: NO), the data transfer instruction program 142 performs the processing of S302 for the undetermined VOL.

In a case where the RAID levels are the same (S303: YES), the data transfer instruction program 142 references the VOL information table (capacity 102) and checks whether or not the capacity of the determination-target VOL is equal to or larger than the capacity of the first VOL (S304).

In a case where the capacity of the determination-target VOL is not equal to or larger than the capacity of the first VOL (S304: NO), the data transfer instruction program 142 performs the processing of S302 for the undetermined VOL.

In a case where the capacity of the determination-target VOL is equal to or larger than the capacity of the first VOL (S304: YES), the data transfer instruction program 142 references the RAID group information table 94 (compression/decompression unit status 115) and checks whether or not the data compression/decompression unit of the RAID group constituting the basis of the determination-target VOL is ON (S305).

In a case where the data compression/decompression unit is not ON (S305: NO), the data transfer instruction program 142 performs the processing of S302 for the undetermined VOL.

In a case where the data compression/decompression unit is ON (S305: YES), the data transfer instruction program 142 stores the determination-target VOL as a third VOL candidate (S306).

The data transfer instruction program 142 displays information related to the transfer-destination VOL candidate stored in S306 in the third VOL specification area 294.

Figure 31:
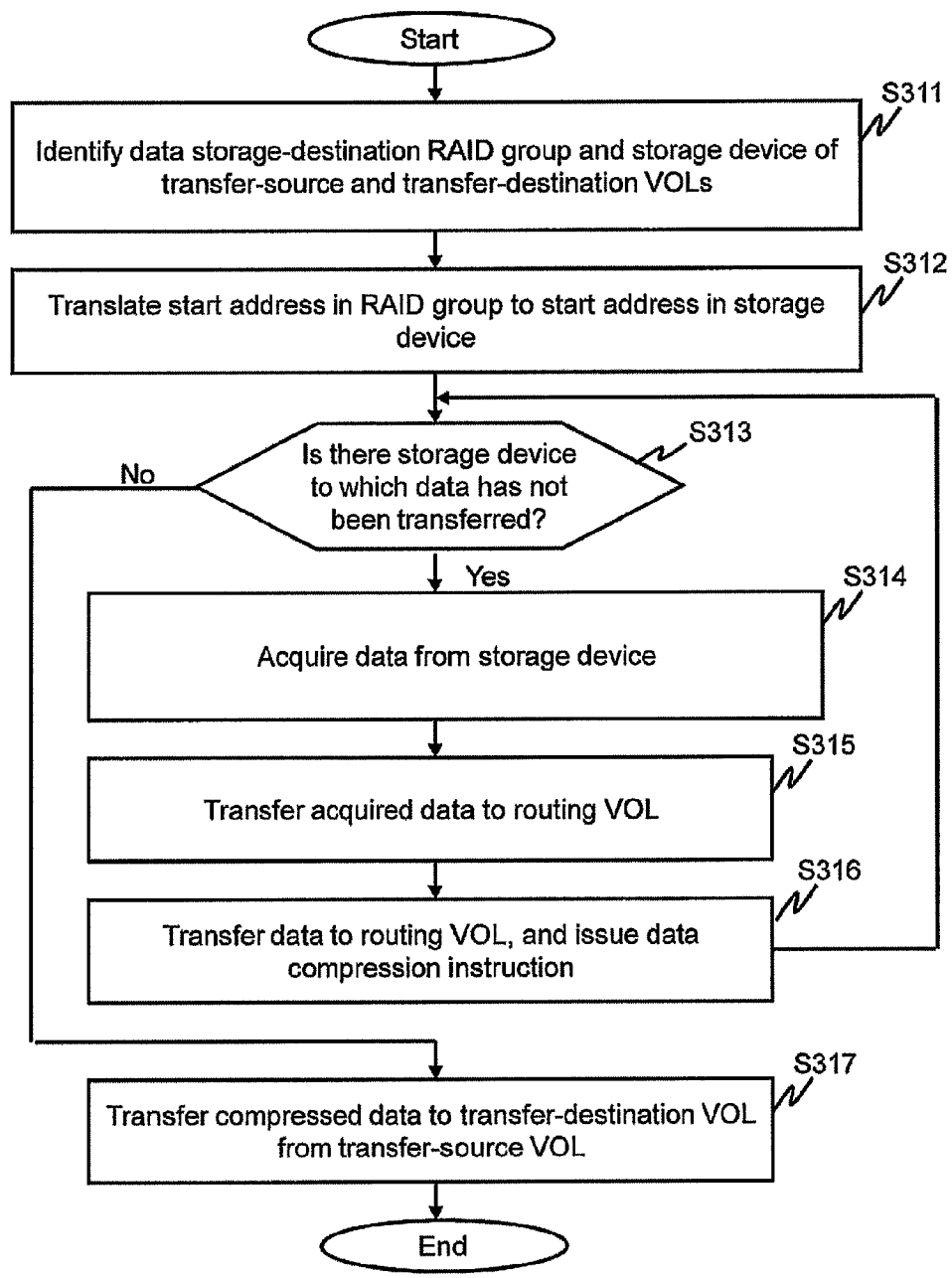
FIG. 31 shows an example of the flow of processing performed by the data transfer program 92 in the controller 27.

FIG. 31 shows an example of the processing flow performed by the data transfer program 92 in the controller 27.

When the OK button 298 on the user setting screen 290 has been pressed, the data transfer program 92 receives an instruction from the data transfer instruction program 142 and starts this processing flow in accordance with the instruction. In accordance with this processing performed by the data transfer program 92, a remote copy of data is realized from a RAID group, which does not comprise a compression/decompression unit (the RAID group constituting the basis of the first VOL), to a RAID group, which does comprise a compression/decompression unit (the RAID group constituting the basis of the second VOL), by being routed through a RAID group comprising a compression/decompression unit (the RAID group constituting the basis of the third VOL).

The data transfer program 92 references the RAID group information table 94, the RAID group configuration information table 95, and the storage device information table 96, and identifies the storage devices, which make up the RAID group constituting the basis of the VOL, for each of the first VOL (transfer-source VOL), the second VOL (transfer-destination VOL), and the third VOL (routing VOL) (S311).

The data transfer program 92 translates the start addresses 105 (RAID group) to the storage device addresses for the first VOL and the third VOL (S312).

The data transfer program 92 checks whether or not there is a storage device to which data has not been transferred (S313). The check here is performed to determine whether or not there is data, which has not been transferred from the first VOL to the third VOL.

In a case where a storage device to which data has not been transferred exists (S313: YES), the data transfer program 92 sends a read request specifying the start address of the storage device and the data length to the respective storage devices, which make up the RAID group constituting the basis of the first VOL, thereby acquiring the uncompressed data to be transferred to the respective storage devices of the RAID group constituting the basis of the third VOL (S314).

The data transfer program 92 transfers the uncompressed data acquired from the storage devices, together with the locations in RAID 122 and the start addresses (RAID group) 105, to the controller of the storage system comprising the third VOL (hereinafter, "third controller" in the explanation of FIG. 31) (S315).

The data transfer program 92 instructs the third controller to write the uncompressed data, which were transferred in S315, to the start addresses, which were transferred in S315, of the storage devices corresponding to the locations in RAID 122, which were transferred in S315 (S316).

In a case where storage devices to which data has not been transferred do not exist (S313: NO), the data transfer program 92 transfers compressed data from the respective storage devices constituting the basis of the third VOL to the respective storage devices constituting the basis of the second VOL (S317). The transfer of data from the RAID group constituting the basis of the third VOL to the RAID group constituting the basis of the second VOL is the same as the transfer of data from the RAID group constituting the basis of the first VOL to the RAID group constituting the basis of the second VOL described with respect to Example 1.

Furthermore, this processing flow is used as an example of a case in which different storage systems comprise the first VOL and the third VOL, but in a case where the first VOL and the third VOL exist in a single storage system, in S315 and S316, the controller performs a data read from the respective storage devices constituting the basis of the first VOL, and a data write to the respective storage devices constituting the basis of the third VOL.

Example 3

Example 3 will be explained below. In so doing, the explanation will focus on the points of difference with Example 1, and explanations of the points in common with Example 1 will be simplified or omitted. Furthermore, Example 3 can also be applied to Example 2.

Figure 32:
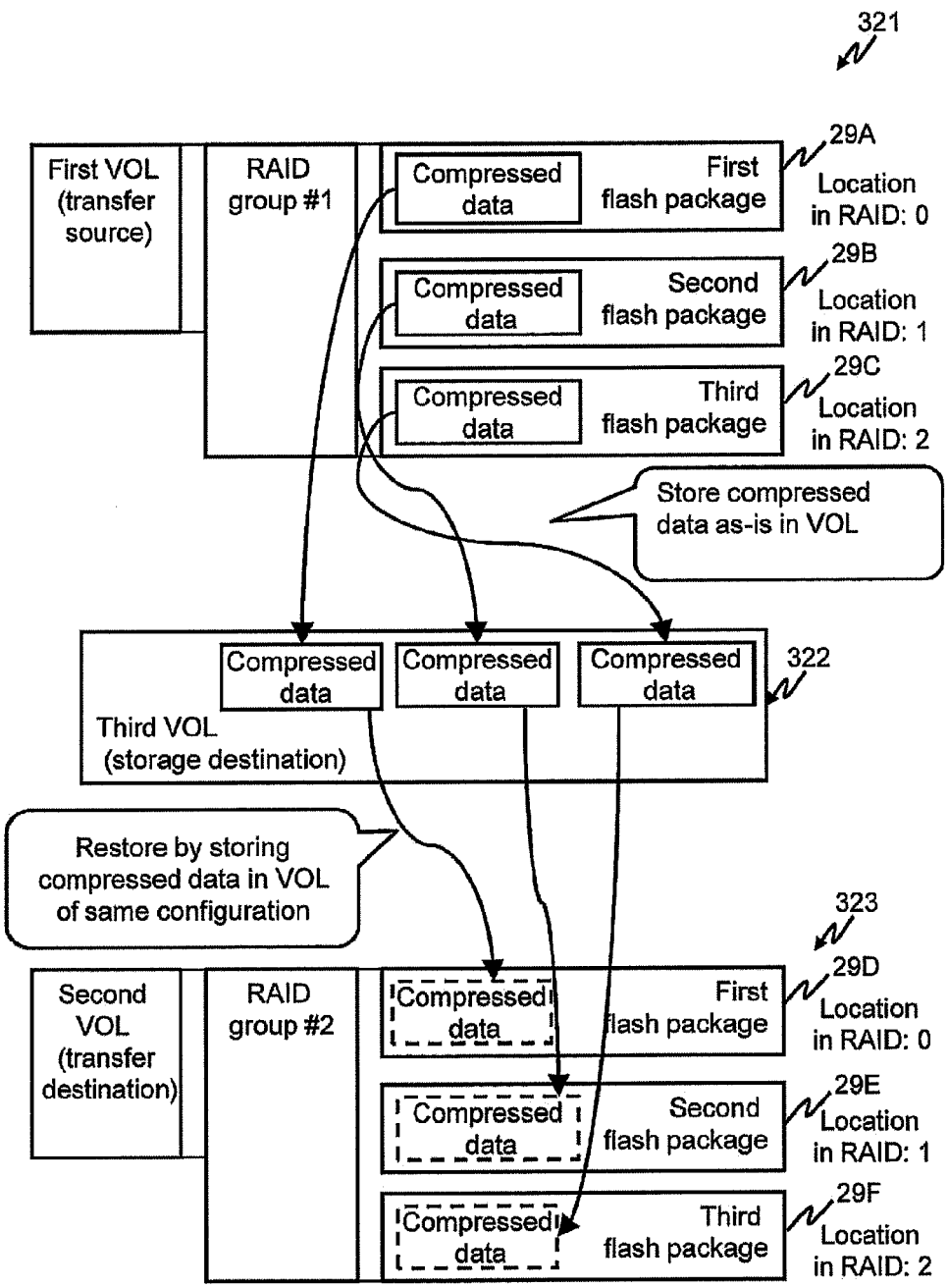
FIG. 32 shows an overview of processing in a remote copy system related to Example 3.

FIG. 32 shows an overview of a remote copy system related to Example 3.

In Example 3, compressed data, which is to be transferred from a first VOL (transfer source) to a second VOL (transfer destination), is temporarily stored in a third VOL (storage destination), and thereafter, the compressed data is sent from the third VOL to the RAID group constituting the basis of the second VOL. Specifically, for example, the compressed data is transferred to the third VOL from the respective flash packages 29A, 29B, and 29C, which constitute the basis of the first VOL.

In Example 3, the compressed data may be stored in a storage device in the RAID group constituting the basis of the third VOL without actually going through the third VOL. Specifically, in Example 1, compressed data is remote copied from a RAID group #1, which constitutes the basis of a first VOL, to a RAID group #2, which constitutes the basis of a second VOL, but the second VOL at that time becomes the third VOL in this example.

However, in Example 3, the third VOL may be regarded as the storage destination of the compressed data. That is, the compressed data may be dispersibly stored in multiple storage devices, which make up the RAID group constituting the basis of the third VOL, in accordance with the RAID level of this RAID group. This kind of innovation makes it possible to remote copy the compressed data of the respective storage devices constituting the basis of the first VOL to the respective storage devices constituting the basis of the second VOL even when the physical distance between the storage system 321 comprising the first VOL and the storage system 323 comprising the second VOL is greater than in Example 1.

Furthermore, in a case where the data transfer destination is a VOL, the controller of the storage system comprising this VOL receives information comprising the ID of the VOL (for example, a LUN (Logical Unit Number)) as the data write destination information. Alternatively, in a case where the data transfer destination is a storage device rather than a VOL, the controller of the storage system comprising this storage device receives the location in RAID of the storage device and a data length as the data write destination information. The type of information in which the write destination information is included will differ like this in accordance with whether the data transfer destination is a VOL or a storage device. The data to be transferred, for example, is compressed data in the case of this example, but in Example 2, is either compressed data or uncompressed data.

Next, the transfer of the compressed data from the third VOL to the second VOL is performed. In order to assure the dispersibility of the data at this time, the compressed data transferred from the first flash package 29A is transferred to the fourth flash package 29D, the compressed data transferred from the second flash package 29B is transferred to the fifth flash package 29E, and, in addition, the compressed data transferred from the third flash package 29C is transferred to the sixth flash package 29E.

That is, in a case where the compressed data is to be transferred from the first VOL to the third VOL, there is no need to take into account the RAID configuration of the RAID group constituting the basis of the third VOL, the location in RAID, and the location in RAID and the type of compression/decompression unit, but when the compressed data is to be transferred from the third VOL to the second VOL, all of (Condition 1) through (Condition 4) described with respect to Example 1 must be met for the first VOL and the second VOL.

Figure 33:
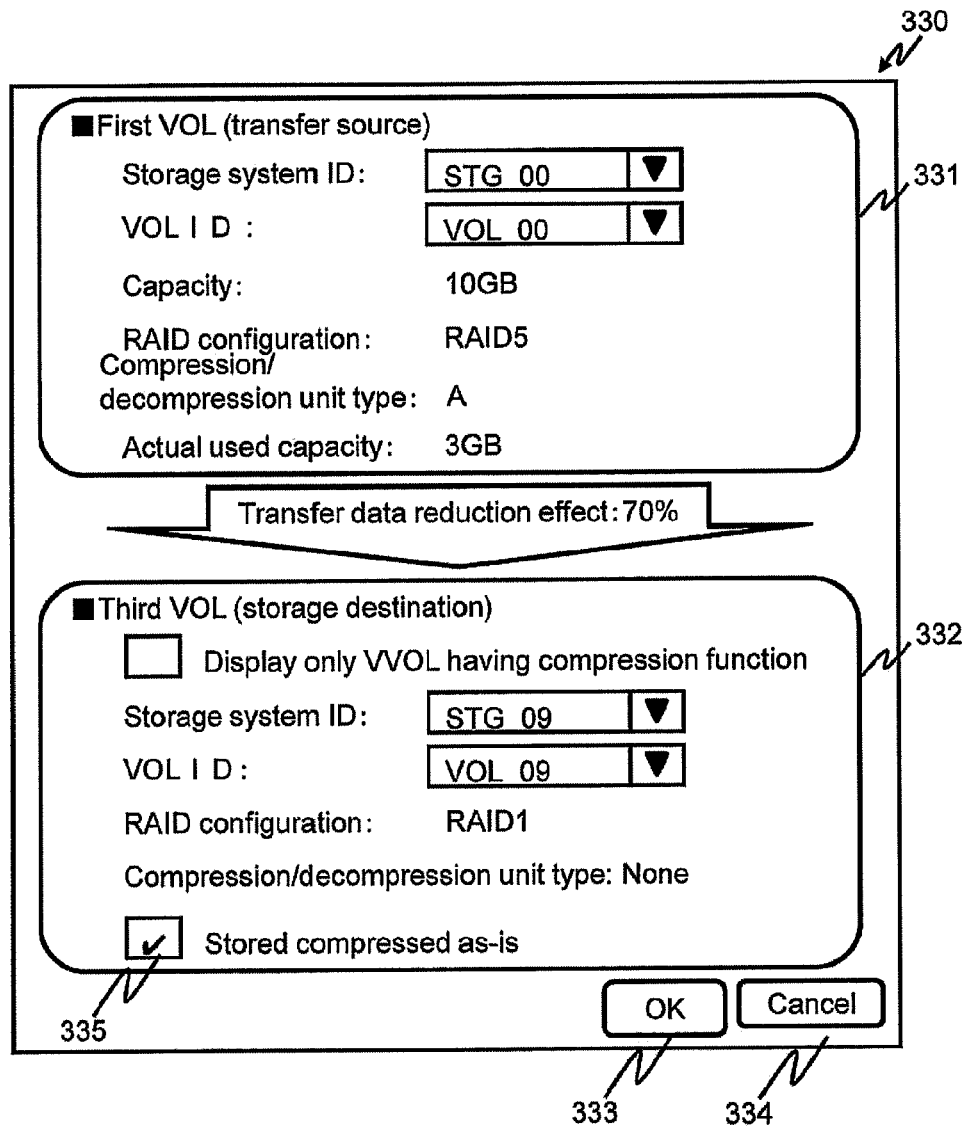
FIG. 33 shows an example of a user setting screen 330.

FIG. 33 shows an example of a user setting screen 330.

The user setting screen 330, in addition to the first VOL specification area 331, comprises a third VOL specification area 333 for specifying a third VOL, which will become the storage destination. The user specification screen 330 is displayed on the display device of the management system (not shown in the drawing) in accordance with the data transfer program 92.

When the first VOL is specified, a VOL capable of becoming the storage-destination VOL is displayed in the third VOL specification area 333. As described hereinabove, the respective storage devices constituting the basis of the third VOL may or may not comprise compression/decompression units.

Furthermore, although the compressed data from the first VOL is stored in the VOL specified in the third VOL specification area 333 when a check is entered into a checkbox 335 "store compressed as-is", this compressed data is not transferred to the second VOL. This is because the data transfer amount reduction effect cannot be expected if either of the following conditions is met:
(*) There is no VOL based on a RAID group having the same type of compression/decompression unit as the compression/decompression unit of the RAID group constituting the basis of the first VOL; or
(*) there is no VOL based on a RAID group having the same RAID configuration as the RAID configuration of the RAID group constituting the basis of the first VOL.

When the OK button 333 is pressed without the checkbox 335 being checked, the compressed data is remote copied to the third VOL from the respective storage devices, which make up the RAID group constituting the basis of the first VOL. Alternatively, when the Cancel button 334 is pressed, the specifications of the first VOL (transfer source) and the third VOL (storage destination) are cancelled.

Figure 34:
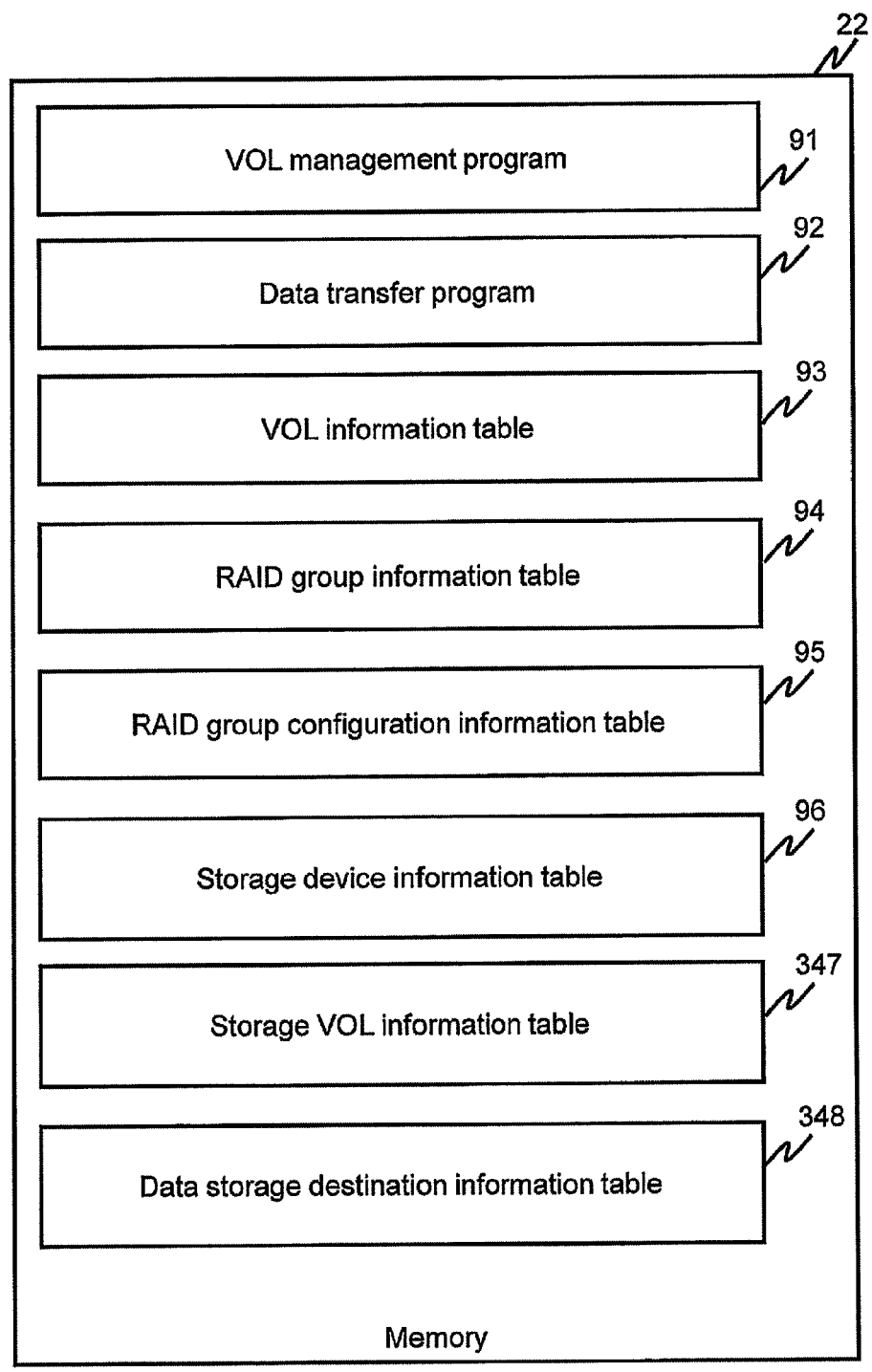
FIG. 34 shows an example of programs and information stored in the memory 22.

FIG. 34 shows an example of the programs and information stored in the memory 22.

The memory 22 stores a storage VOL information table 347 and a data storage destination information table 348 in addition to the programs and information (91 through 96) explained with respect to Example 1.

FIG. 35 shows an example of the configuration of the storage VOL information table 347.

The storage VOL information table 347 associatively stores a storage-destination VOL ID 351, a capacity 352, a used capacity 357, an actual used capacity 353, a RAID level 354, a compression/decompression algorithm 355, and a data storage destination ID 356 for each storage-destination VOL.

The storage-destination VOL ID 351 is information for identifying a storage-destination VOL (third VOL).

The capacity 352 is information showing the capacity of the storage-destination VOL.

The used capacity 357 is information showing the sum of the data stored in the storage-destination VOL.

The actual used capacity 353 is information showing the amount of data actually stored in one or more storage devices of the data stored in the storage-destination VOL.

The RAID level 354 is information showing the RAID level of the RAID group, which constitutes the basis of the storage-destination VOL.

The compression/decompression algorithm 355 is information showing the program algorithm of the compression/decompression unit of the RAID group constituting the basis of the storage-destination VOL.

The data storage-destination ID 356 is information for identifying a row of the data storage destination information table 348.

FIG. 36 shows an example of the configuration of the data storage destination information table 348.

The data storage destination information table 348 associatively stores a data storage destination ID 361, a RAID level 362, a location in RAID 363, a storage-destination VOL ID 364, a start address 365, and a data length 366 for each compressed dataset. The compressed dataset here is multiple pieces of compressed data stored in a single stripe of the RAID group. Read-target data is restored from a VOL based on data obtained by these multiple pieces of compressed data having been respectively decompressed.

The data storage destination ID 361 is information for identifying a compressed dataset.

The RAID level 362 is information showing the RAID level of the RAID group in which the compressed dataset is stored.

The location in RAID 363 is information showing the locations in the RAID group of the respective flash packages, which make up the RAID group in which the compressed dataset is stored.

The storage-destination VOL ID 364 is information for identifying the VOL storing the compressed data for each piece of compressed data included in the compressed dataset.

The start address 365 is information showing the storage destination start address in the RAID group of the compressed data stored in the storage-destination VOL for each piece of compressed data included in the compressed dataset.

The data length 366 is information showing the length of the compressed data for each piece of compressed data included in the compressed dataset.

According to the example of FIG. 36, the multiple pieces of compressed data comprising one compressed dataset are not necessarily stored in the same VOL. For example, these multiple pieces of compressed data may be stored in different storage-destination VOLs. The storage destination, no matter what it is, has no affect on the transfer-destination RAID group of the compressed dataset.

Figure 37:
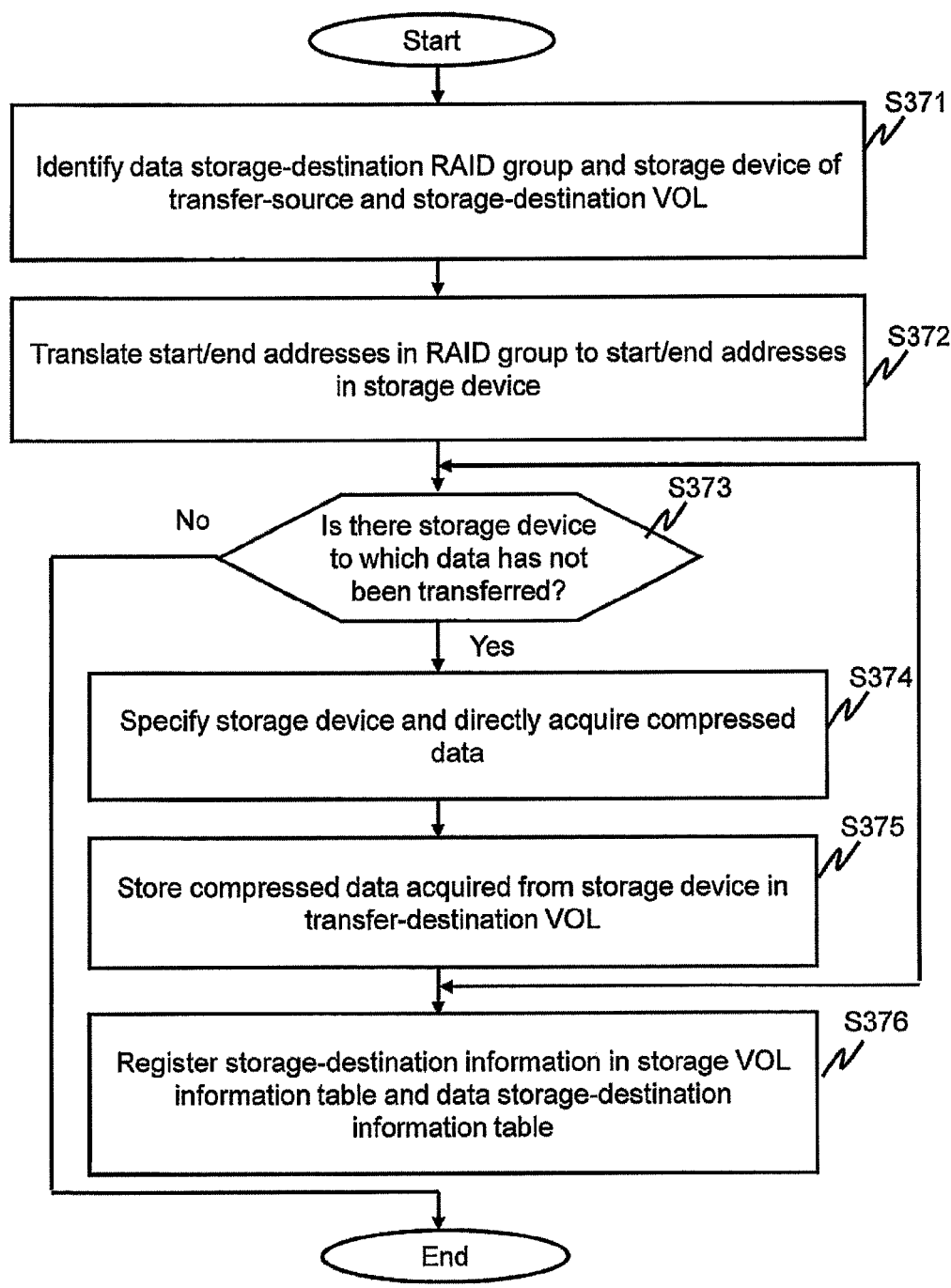
FIG. 37 shows an example of the flow of processing performed by the data transfer program 92 in the controller 27.

FIG. 37 shows an example of the flow of processing performed by the data transfer program 92 in the controller 27.

The data transfer program 92, in a case where a check is entered into the checkbox 335 "store compressed as-is", and, in addition, the OK button 333 has been pressed, receives an instruction from the data transfer instruction program 142, and starts this processing flow in accordance with this instruction. In accordance with this processing flow performed by the data transfer program 92, compressed data is transferred from the RAID group constituting the basis of the transfer-source VOL (first VOL) to the storage-destination VOL (third VOL).

The data transfer program 92 references the RAID group information table 94, the RAID group configuration information table 95, and the storage device information table 96, identifies the respective storage devices, which constitute the basis of the first VOL (transfer-source VOL), references the storage VOL information table 347, and identifies the third VOL (storage-destination VOL) (S371).

The data transfer program 92 translates the start address 105 (RAID group) to the storage device start addresses for the first VOL (S372).

The data transfer program 92 checks whether or not there is a storage device to which data has not been transferred (S373). Specifically, the check here is performed to determine whether or not there is data, which has not been transferred from the first VOL to the third VOL.

In a case where a storage device to which data has not been transferred does not exist (S373: NO), the data transfer program 92 ends the processing.

In a case where a storage device to which data has not been transferred exists (S373: YES), the data transfer program 92 sends a read request specifying the start address of the storage device and a data length, and acquires the compressed data to be transferred to the third VOL from the respective storage devices, which constitute the basis of the first VOL (S374).

The data transfer program 92 transfers the compressed data acquired from the storage devices, together with the locations in RAID 122 and the start addresses (RAID group) 105, to the controller of the storage system comprising the third VOL (hereinafter, "third controller" in the explanation of FIG. 37) (S375). In this S375, a write request, which has the compressed data as the write target and the third VOL as the write destination, may be sent to the third controller.

The data transfer program 92 registers the ID of the compressed data transfer-destination VOL of S375 as the storage-destination VOL ID 364 in the data storage destination information table 348 (S376). In the S376, the start addresses 365 and 366 may also be stored with respect to the compressed data transferred in S375.

Figure 38:
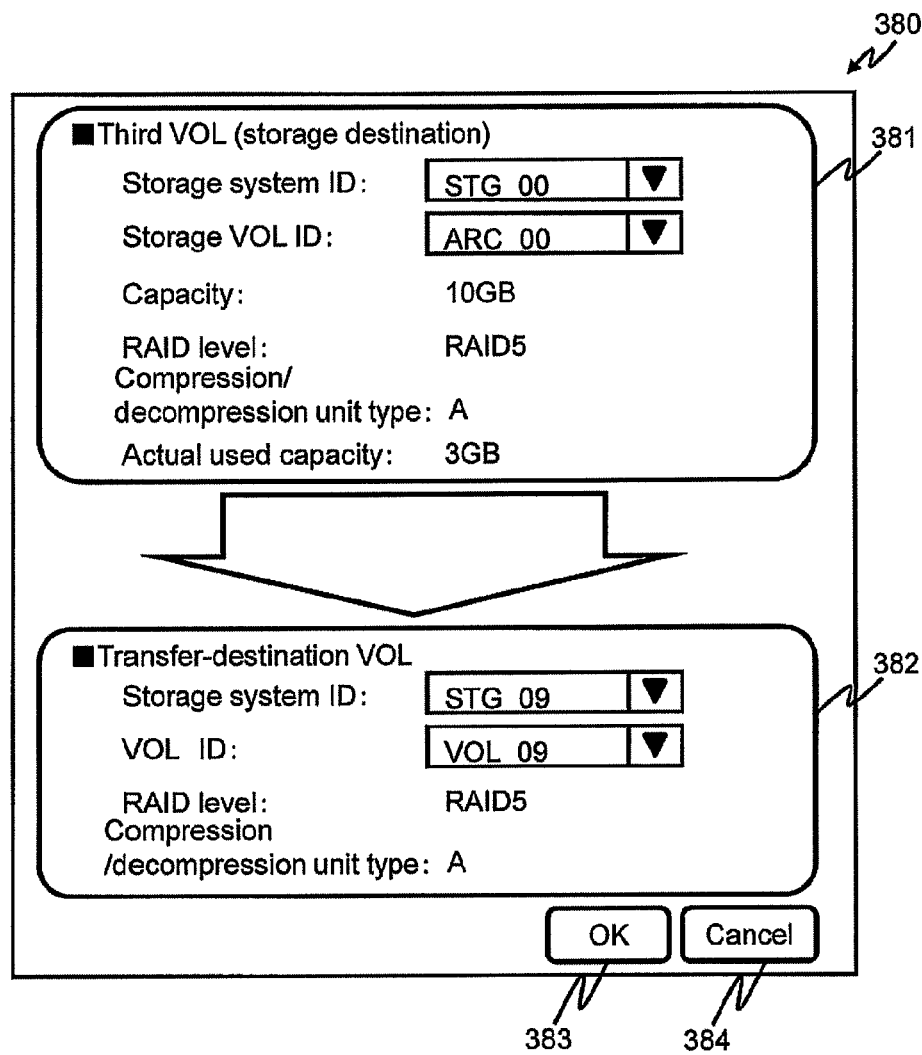
FIG. 38 shows an example of a user setting screen 380.

FIG. 38 shows an example of a user setting screen 380.

The user setting screen 380 comprises a third VOL specification area 381 for specifying a third VOL, and a second VOL specification area 382 for specifying a second VOL, which is to become the transfer destination. The user setting screen 380, for example, is displayed on the display device of the management system 14 (not shown in the drawing) by the data transfer program 92.

When the storage system ID and VOL ID of a user-desired storage-destination VOL are specified in the third VOL specification area 381, information related to the specified storage-destination VOL (for example, the capacity, the RAID level, the compression/decompression unit type, and the actual used capacity) is displayed.

When the storage-destination VOL is specified, information related to the second VOL, which is the transfer destination for the transfer-source VOL of the compressed data in the storage-destination VOL, is displayed in the second VOL specification area 382.

When the OK button 383 is pressed, the compressed data is remote copied from the third VOL specified in the user setting screen 380 to the respective storage devices constituting the basis of the second VOL.

Figure 39:
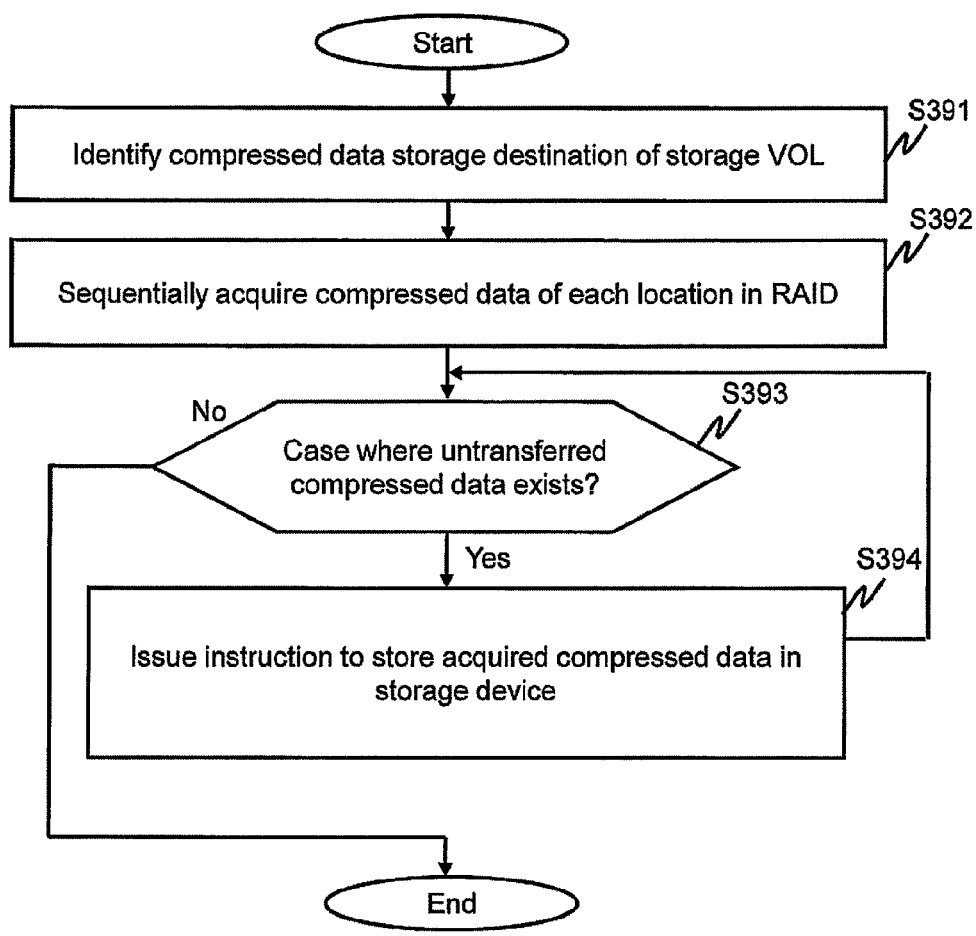
FIG. 39 shows an example of the processing of the data transfer program 92 in the controller 27.

FIG. 39 shows an example of the processing of the data transfer program 92.

The data transfer program 92 executes the following processing in accordance with an instruction from the data transfer instruction program 142. According to this processing, the transfer of compressed data is performed from the third VOL to the respective storage devices, which constitute the basis of the second VOL.

The data transfer program 92 identifies the storage-destination VOL of the respective pieces of compressed data comprising the compressed dataset, and the storage destination in the storage-destination VOL from the storage VOL information table 347 and the data storage destination information table 348 (351, 361) (S391).

The data transfer program 92 acquires the compressed data from the RAID group, which constitutes the basis of the storage-destination VOL (S392).

The data transfer program 92 checks whether or not there is a compressed dataset, which has not been transferred to the third VOL (S393).

In a case where an untransferred compressed datasets does not exist (S393: NO), the data transfer program 92 ends the processing.

Alternatively, in a case where an untransferred compressed dataset exists (S393: YES), the data transfer program 92 sends an instruction to the controller of the storage system comprising the second VOL to store this compressed data in the storage device, which is in the location in RAID corresponding to the compressed data, for each piece of compressed data comprising the compressed dataset acquired in S392 (S394).

A number of examples have been explained hereinabove, but the present invention is not limited to these examples.

For example, compression and/or decompression may be performed by the CPU, which executes the computer programs, instead of being performed by a compression/decompression unit. That is, the compression function and/or the decompression function may be realized in accordance with executing a computer program rather than being realized using a dedicated hardware circuit.

Also, for example, a virtual VOL (hereinafter, VVOL), which conforms to Thin Provisioning technology, may be used as at least one of the transfer-source VOL or the transfer-destination VOL. In accordance with this, a pool comprising one or more VOLs is prepared. Each VOL comprising the pool is partitioned into multiple storage areas (hereinafter, segments). Each segment is based on multiple storage areas comprising a RAID group. A segment is allocated to a write-destination area in the VVOL. A remote copy of compressed data between RAID groups of different storage systems is performed in units of segments. That is, for example, in a case where the RAID configuration of the RAID group, which constitutes the basis of the transfer-source area, and the compression/decompression unit type are the same as the RAID configuration of the RAID group, which constitutes the basis of the transfer-destination area, and the compression/decompression unit type, compressed data is transferred from the transfer-source area to the transfer-destination area, and at least one of the transfer-source area and transfer-destination area is a segment.

Also, for example, the present invention may be used for the purpose of reducing the amount of data transferred over an internal bus in a storage. In this case, the transfer-source VOL and the transfer-destination VOL exist inside the same storage system. That is, in this case, the present invention is used as a copy function inside the same storage.

REFERENCE SIGNS LIST

10 Host computer
14 Management system
20 Storage system
29A Flash package
37 FM chip

The invention claimed is:

1. A storage system coupled to a host computer, comprising:
  a first storage system; and
  a second storage system coupled to the first storage system;
  wherein the first storage has:
    a controller; and
    a plurality of storage devices providing a volume to the host computer, at least one storage device of the first storage system including a compressing/decompressing function for compressing write-target data and decompressing read-target data;
  wherein the second storage has:
    a controller; and
    a plurality of storage devices providing a volume to the host computer;
  wherein the controller of the first storage system is configured to:
    receive data from the host computer;
    compress the received data;
    store the compressed data in the storage device of the first storage system;
    receive a read request for reading the compressed data without performing decompression; and
    send the compressed data to the second storage system;
  wherein the controller of the second storage system is configured to:
    receive the compressed data from the first storage system; and
    store the compressed data in the storage device of the second storage system as received.

2. The storage system according to claim 1, wherein at least one storage device of the second storage system furthermore includes a compressing/decompressing function; and wherein the controller of the second storage system stores the compressed data in the storage device of the second storage system as received without performing compression.

3. The storage system according to claim 2, wherein the volume of the first storage system is configured by RAID into a plurality of RAID groups; wherein the volume of the second storage system is configured by RAID into a plurality of RAID groups; and wherein a RAID location of the compressed data in the first storage system is the same as a RAID location of the compressed data in the second storage system, the RAID location is a location in a RAID group.

4. The storage system according to claim 3, wherein the compressing/decompressing function of the first storage system is the same as the compressing/decompressing function of the second storage system.

5. The storage system according to claim 4, wherein the plurality of devices of the first storage system includes at least one flash memory device; and wherein the plurality of devices of the second storage system includes at least one flash memory device.

6. The storage system according to claim 5, furthermore includes a management computer, wherein the management computer outputs a reduction effect.

7. The storage system according to claim 6, wherein the reduction effect includes a compression reduction effect.

8. The storage system according to claim 6, wherein the reduction effect includes a transfer speed.

* * * * *